US007046779B2

(12) United States Patent
Hesse

(10) Patent No.: US 7,046,779 B2
(45) Date of Patent: May 16, 2006

(54) VIDEO CONFERENCE SYSTEM AND METHODS FOR USE AT MULTI-STATION SITES

(75) Inventor: Thomas H. Hesse, Mesa, AZ (US)

(73) Assignee: Multimedia Telesys, Inc., Tempe, AZ (US)

( * ) Notice: Subject to any disclaimer, the term of this patent is extended or adjusted under 35 U.S.C. 154(b) by 180 days.

(21) Appl. No.: 10/076,276

(22) Filed: Feb. 15, 2002

(65) Prior Publication Data

US 2003/0174826 A1    Sep. 18, 2003

(51) Int. Cl.
*H04M 3/42* (2006.01)
(52) U.S. Cl. .............................. 379/202.01; 379/203.01
(58) Field of Classification Search ...............................
379/202.01–206.01, 207.01
See application file for complete search history.

(56) References Cited

U.S. PATENT DOCUMENTS

| 4,360,827 A | 11/1982 | Braun |
| 4,965,819 A | 10/1990 | Kannes |
| 4,994,908 A | 2/1991 | Kuban et al. |
| 5,541,639 A | 7/1996 | Takatsuki et al. |
| 5,553,609 A | 9/1996 | Chen et al. |
| 5,559,875 A | 9/1996 | Bieselin et al. |
| 5,589,873 A | 12/1996 | Natori et al. |
| 5,589,878 A | 12/1996 | Cortjens et al. |
| 5,642,156 A | 6/1997 | Saiki |
| 5,719,928 A | 2/1998 | Pinnell et al. |
| 5,781,731 A * | 7/1998 | Koreeda et al. ............ 709/204 |
| 5,841,469 A | 11/1998 | Freeman et al. |
| 5,848,132 A | 12/1998 | Morley et al. |
| 5,852,466 A | 12/1998 | Komine et al. |
| 5,961,446 A | 10/1999 | Beller et al. |
| 5,978,363 A | 11/1999 | Dimitrijevic et al. |
| 5,999,208 A | 12/1999 | McNerney et al. |
| 6,009,169 A | 12/1999 | Styron |
| 6,163,798 A | 12/2000 | Frank |
| 6,181,789 B1 | 1/2001 | Siegmund et al. |
| 6,192,118 B1 | 2/2001 | Bayless et al. |
| 6,195,117 B1 | 2/2001 | Miyazaki |
| 6,205,716 B1 | 3/2001 | Peltz |
| 6,275,251 B1 | 8/2001 | Hartman et al. |

* cited by examiner

*Primary Examiner*—Benny Quoc Tieu
(74) *Attorney, Agent, or Firm*—Schmeiser Olsen & Watts, LLP

(57) ABSTRACT

A video conference system includes at each of several sites multiple participant stations and a control station. A conference coordinator (e.g., a guard or receptionist) operating the control station receives notice from the control station that a scheduled conference is about to begin and directs a person identified to be a participant of the conference to a station designated by the notice. Signals from participant stations are monitored and if a participant station is determined to be unavailable, the conference may be rescheduled to replace the unavailable station with an alternate available station. Notice sufficient to direct a participant to the alternate station is provided via the control station to the coordinator. The subject of detecting availability and rescheduling alternatives may be an item of equipment or an equipment capability (e.g., a recorder channel to be used for recording the conference). Higher ranking requests may force rescheduling of already scheduled lower ranking conferences.

42 Claims, 19 Drawing Sheets

| CONFERENCES 702 |
|---|
| CONFERENCE ID |
| START DATE – TIME |
| END DATE – TIME |
| STATUS, REQUESTED, CONFIRMED, READY, IN-PROGRESS, RECONNECTING, COMPLETED, CANCELED |
| RULES |

FIG. 7B

| EQUIPMENT PLANS 704 |
|---|
| CONFERENCE ID |
| EQUIPMENT ID |
| PARTICIPANT RANK |
| NEEDED AT LOCATION |
| TRANSIT TIME ALLOWANCE |
| STATUS: REQUESTED, CONFIRMED, COMPLETED, CANCELED |

FIG. 7C

| EQUIPMENT | 710 |
|---|---|
| EQUIPMENT ID | |
| EQUIPMENT TYPE | |
| CURRENT EQUIPMENT LOCATION | |
| AVAILABILITY | |
| ON-OFF LINE FLAG | |
| DATE-TIME BACK IN SERVICE | |
| DATE-TIME LAST TESTED | |
| MAXIMUM PERIOD BETWEEN TESTS | |

FIG. 7D

| EQUIPMENT DESCRIPTIONS | 716 |
|---|---|
| EQUIPMENT TYPE | |
| EQUIPMENT DESCRIPTION | |

FIG. 7E

| EQUIPMENT TESTS | 718 |
|---|---|
| EQUIPMENT TYPE | |
| TEST PROCEDURES | |
| TEST PARAMETERS, LIMITS | |

FIG. 7F

| INMATE PLANS 706 |
|---|
| CONFERENCE ID |
| NAME |
| PARTICIPANT RANK |
| NEEDED AT LOCATION |
| TRANSIT TIME ALLOWANCE |
| STATUS: REQUESTED, CONFIRMED, COMPLETED, CANCELED |

FIG. 7G

| VISITOR PLANS 708 |
|---|
| CONFERENCE ID |
| NAME |
| PARTICIPANT RANK |
| NEEDED AT LOCATION |
| TRANSIT TIME ALLOWANCE |
| STATUS: REQUESTED, CONFIRMED, COMPLETED, CANCELED |

FIG. 7J

| INMATES 712 |
|---|
| INMATE NAMES |
| CURRENT INMATE LOCATION |
| AVAILABILITY |
| DATE-TIME LAST CHECK-IN |
| MAXIMUM PERIOD BETWEEN CHECK-INS |
| GUARD NAME |

FIG. 7H

| VISITORS 714 |
|---|
| NAME |
| AVAILABILITY |
| PERMITTED TYPE OF VISIT |
| START DATE-TIME FOR PERMITTED VISIT |
| END DATE-TIME FOR PERMITTED VISIT |
| MINIMUM PERIOD BETWEEN VISITS |

FIG. 7K

| ITINERARIES 720 |
|---|
| NAME OR EQUIPMENT ID |
| LOCATION OR VEHICLE |
| TRANSPORT PURPOSE |
| TRANSIT START DATE-TIME |
| TRANSIT END DATE-TIME |

FIG. 7I

| INMATE'S VISITORS 722 |
|---|
| INMATE NAME |
| VISITOR NAME |
| RELATIONSHIP |
| DATE-TIME OF LAST CONFERENCE |

FIG. 7L

| CONTACTS | 724 |
|---|---|
| NAME | |
| ROLE: VISITOR, INMATE, GUARD | |
| CONTACT INFORMATION | |

FIG. 7M

| TRANSIT TIMES | 726 |
|---|---|
| TRANSIT FROM LOCATION | |
| TRANSIT TO LOCATION | |
| TRANSIT TIME ALLOWANCE | |

FIG. 7N

| VISIT REQUESTS | 902 |
|---|---|
| REQUEST ID | |
| VISITOR ID | |
| INMATE ID | |
| LOCATION (OF VISITOR) | |
| LOCATION (OF INMATE) | |
| BOOTH TYPE (FOR VISITOR) | |
| BOOTH TYPE (FOR INMATE) | |
| TYPE OF VISIT | |
| REQUESTED DATE-TIME | |
| REQUESTED DURATION | |
| REQUEST CREATED DATE-TIME | |
| DISPOSITION | |
| RESERVATION ID | |

FIG. 9B

| LOCATION LOOKUPS | 904 |
|---|---|
| IJMS LOCATION ID | |
| LOCATION ID | |

FIG. 9C

| BOOTH LOOKUPS | 906 |
|---|---|
| IJMS BOOTH ID | |
| BOOTH ID | |

FIG. 9D

| RESERVATIONS | 908 |
|---|---|
| RESERVATION ID | |
| BOOTH ID (FOR VISITOR) | |
| BOOTH ID (FOR INMATE) | |
| CHANNEL ID | |
| START DATE-TIME | |
| END DATE-TIME | |
| DURATION | |
| RESERVATION CREATION DATE-TIME | |
| STATUS: REQUESTED, CONFIRMED | |

FIG. 9E

| LOCATIONS | 910 |
|---|---|
| LOCATION ID | |
| TYPE OF ACCESS | |
| DESCRIPTION | |

FIG. 9F

| RECORDING CHANNELS | 912 |
|---|---|
| CHANNEL ID | |
| RECORDING PORT | |

FIG. 9G

| BOOTHS | 914 |
|---|---|
| BOOTH ID | |
| LOCATION ID | |
| BOOTH TYPE | |
| VIDEO PORT | |
| AUDIO PORT | |
| VIDEO EQUIPMENT ID | |
| AUDIO EQUIPMENT ID | |

FIG. 9H

| CHANNEL TIMES | 916 |
|---|---|
| CHANNEL ID | |
| DATE-TIME SLOT | |

FIG. 9I

| BOOTH TIMES | 918 |
|---|---|
| BOOTH ID | |
| DATE-TIME SLOT | |

FIG. 9J

| RESERVATION EVENTS | 920 |
|---|---|
| RESERVATION ID | |
| STATE | |
| POSTED DATE-TIME | |

FIG. 9K

| CHANNEL EVENTS | 922 |
|---|---|
| CHANNEL ID | |
| STATE | |
| POSTED DATE-TIME | |

FIG. 9L

| BOOTH EVENTS | 924 |
|---|---|
| BOOTH ID | |
| STATE | |
| POSTED DATE-TIME | |

FIG. 9M

VIDEO CONFERENCE SYSTEM AND METHODS FOR USE AT MULTI-STATION SITES

FIELD OF THE INVENTION

Embodiments of the present invention relate to video conference systems and methods of operation of video conference systems.

BACKGROUND OF THE INVENTION

In a conventional video conference system, the participants may be notified to attend the conference at particular locations. Each location typically has one installed video conference facility including for example microphones, cameras, and network links for communication to several other similar facilities. The communication typically includes audio and video signals used to support business conversation, business graphics, and eye contact among the participants. If a participant arrives at a proper location for the scheduled video conference and for any reason the conference cannot proceed, no provision is made for making a best efforts attempt at accomplishing a business purpose of the video conference.

Without systems and methods according to various embodiments of the present invention, attempts at using video conferencing will continue to result in frustration in some cases because the underlying business purposes or personal purposes for the conference can be frustrated. The difficulty in establishing a value for the loss or damage to business relationships due to unreliable conventional video conferencing systems does not make unreasonable the assertion that unsatisfactory video conferencing may have enormous effects on those who rely on video conferencing for business relationships. Also, by reducing factors that contribute to unreliable video conferencing, future use of video conferencing according to the present invention may expand to meet new applications.

SUMMARY OF THE INVENTION

A prisoner visitation system according to various aspects of the present invention includes a prisoner information system, a conference control station, a visitation site, and a prisoner site. The prisoner information system and all other stations of the system are coupled to a network for communication. The visitation site includes a first station used by a first conference coordinator and a first plurality of conference participant stations. The prisoner site includes a second station used by a second conference coordinator and a second plurality of conference participant sites. A conference is scheduled by an administrator who operates the conference control station. Prisoners and visitors have identifiers maintained in the prisoner information system by a supervisor. The first station provides a first notice of the conference to the first coordinator for assuring that a named prisoner participates at a station of the first plurality as identified in the first notice. The second station provides a second notice of the conference to the second coordinator for assuring that a named visitor participates at a station of the second plurality as identified in the second notice.

By arranging conference participation stations in a multiplicity at each site, use of an alternate conference participation station in the event of failure of a scheduled conference participation station can be automatically arranged and coordinators may be given notice to direct users to appropriate stations.

A conference system according to various aspects of the present invention includes a network, a plurality of participant stations, and a control station. All stations are coupled to the network for communication. The plurality is arranged with at least one site having a multiplicity of participant stations. The control station provides a notice to a participant that directs the participant to a particular participant station of the multiplicity for participating in a conference.

The conference may be a scheduled conference. The conference may be a video conference. The participant stations of the multiplicity may be functionally equivalent having a camera, a microphone, a video display, and an audio speaker.

By scheduling use of a participant station, maximum use of the participant station may be obtained. By scheduling several conferences by the same participant in back to back order using the same participant station, increased convenience to the participant may result. Use of a notice to direct the participant to a suitable station increases utilization of participant stations and reduces confusion when a participant station fails before or during a conference—direction to an alternative station may be given in a timely manner.

A participant may use a conference system for a scheduled conference according to various aspects of the present invention by selecting one of a multiplicity of co-located participant stations, identifying himself or herself to the participant station, and participating in the conference using the selected participant station. Identification may be by login, username, password, by thumb print, or by operation of a control station by a coordinator who ascertains the identification and associates the participant with a participant station.

A conference system according to various aspects of the present invention includes a plurality of hubs. Each hub is coupled to a network for communication. Each hub couples a multiplicity of participant stations to the network. Each hub comprises a processor that refers to a time of day for initiating a conference among participant stations, wherein multiple hubs take action to initiate each conference.

By each hub initiating action for one conference, a single point of control for initiating a conference is avoided. Higher reliability may result from use of conference systems that implement this architecture.

A method for

BRIEF DESCRIPTION OF THE DRAWING

Embodiments of the present invention will now be further described with reference to the drawing, wherein like designations denote like elements, and:

FIGS. 7A through 7N present a class diagram of a database used in the system of FIGS. 1 and 2;

FIGS. 9A through 9M present a class diagram of database used in the system of FIGS. 1 and 2.

DETAILED DESCRIPTION OF THE PREFERRED EMBODIMENTS

Figure 1:
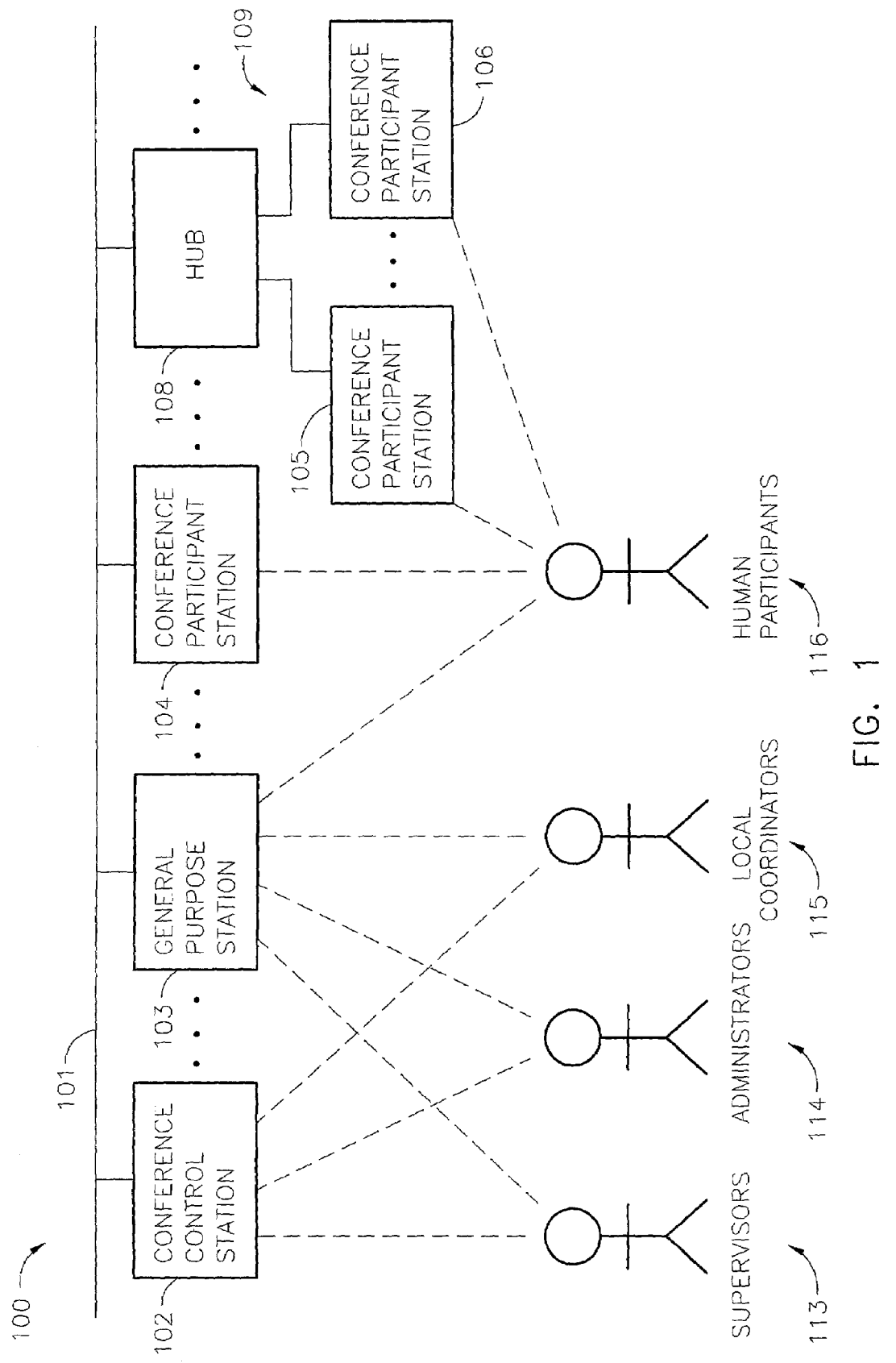
FIG. 1 is a functional block diagram of a video conferencing system according to various aspects of the present invention.

A video conference generally allows each human participant to hear other participants talk and allows each participant to see each other participant, for example, while that participant is speaking. The video conference may include presentations of audio and video programming (e.g., a photograph, a slide show, business graphics, an animation, a movie, or sound recordings) for some or all participants. Participants generally participate in a conference from physically separate locations—each such location in communication with the others via a conventional network that supports audio, video, and presentations. According to various aspects of the present invention, a video conference may substantially achieve an original purpose for conducting the video conference in spite of changes in the availability of participants (e.g., human participant or equipment participant), particular video conference stations, and particular communication links. For example, video conference system 100 of FIGS. 1–2 includes communication network 101; conference control stations 102; general purpose stations 103; conference participant stations 104; hubs 108; and conference participant stations 105 and 106 coupled to hub 108 by links 109.

A network provides signal communication via links between stations or sites. Signals may be analog or digital. Network topology may correspond to local area networks, wide area networks, wireless networks, and combinations including gateways and routers. For example, network 101 includes conventional hardware at each station (e.g., network interface cards) and for each link (e.g., cables, routers, or wireless equipment). Network 101 includes conventional software providing data transfer among processes and storage devices located anywhere in system 100. Access to particular processes and to particular data (e.g., files, directories, or storage devices) may be restricted (e.g., using access control lists, user accounts, or operating system partitions). Network 101 may carry audio and video in suitable digital packets. Or, network 101 may include (e.g., in addition to or in place of digital communication) portions of its analog bandwidth for carrying analog signals that convey channels of audio and channels of video using any conventional network technology.

Each site of system 100 may include any number of stations. A site is an arbitrary grouping of stations organized within a physical boundary, within a political organization, for convenience of installing system components, or for achieving system budgets or efficiencies with hubs in particular areas. Alternate implementations include any number of sites and any number of stations per site. A portable station may be temporarily added to network 101 to meet demand for system functions. For example, if a participant is unexpectedly located away from other stations (e.g., in a vehicle, in a confinement zone, or in a medical area), a portable station may be located anywhere access to network 101 (e.g., access to a hub 108 or any link 101) may be gained by wired or wireless techniques.

Users of system 100 include supervisors 113, administrators 114, local coordinators 115, and human participants 116. A single person may use system 100 in multiple roles. Typically, a person that uses system 100 as a human participant does not perform any other of these roles. Supervisors enter and maintain descriptions of participants including the location of participants. Administrators schedule conferences as requested by human participants. Coordinators are generally located in a convenient vicinity of stations used by participants. Coordinators may relocate and configure equipment participants and notify human participants. A coordinator assists participants (e.g., as an escort or receptionist) in getting to particular locations for scheduled conferences.

Different business rules may apply to human participants using video conferencing system 100. A business rule includes any implementation for controlling use of system 100 (e.g., network connectivity, user accounts, access control lists, use of particular protocols, registration of users, privileges of persons to act as users 113–116 during specified periods, privacy of conferences from each other, recording of conferences, and identification of participants). For example, system 100 may be used with various business rules to support conferences involving prisoners, businessmen, students, educators, officers, constituents, clergy, parishioners, group leaders, and group members, to name a few representative environments.

A video conference generally may be scheduled in advance of beginning the conference so that communication links (e.g., 101 and 109) are established in an orderly fashion and so that equipment and human participants will be available at designated locations (e.g., particular permanently installed conference participant stations). When the location of at least some of the participants is known, notice of the video conference and where to go to participate may be conveyed personally in any conventional manner to those participants. Other participants may be informed indirectly: (a) by giving a message to a coordinator; and/or (b) by using communication less direct than face-to-face (e.g., by conveying a message by mail, telephone, voicemail, or email). The location that a particular participant may be directed to may be a location having numerous video conferencing stations (e.g., a multiple station site). The notice or message may specify a particular video conferencing station. By analogy, equipment (e.g., computer systems, any signal source, any signal recorder, or data item) may be scheduled and notified to participate in a video conference. If a particular human participant or a particular equipment is not free to relocate itself (or be available via any conventional communication) to a suitable physical location, notice may be provided to a coordinator (e.g., guard, escort, receptionist, custodian, or equipment manager).

Stations 102–106 include conventional network interfaces, processors (e.g., conventional computer and microcomputer circuits), data storage devices, audio and video devices, and suitable signal processing circuitry arranged to perform functions and methods of the present invention. Conference participant stations 104–106 support participation in a conference by, among other things, displaying video images, providing sound, picking up sound, and picking up visual images. Other functions are reserved to other stations for security reasons or to reduce the complexity and cost of participant stations. A conference participant station includes any equipment sufficient for a participant to participate in a conference. For example, a video conference station for a human participant includes a camera, a video monitor, a microphone, and a speaker. Any conventional interface technology may be used in an alternate implementation that accepts user input for computation or control purposes, for example, the monitor may further include a touch-screen interface, the station may have a sensor to detect that a person is ready to use the station (e.g., proximity switch), the microphone may have voice recognition capability (e.g., to distinguish "yes" and "no" in various languages), the speaker and microphone may be part of a conventional telephone handset that operates a hook switch, or a keypad or keyboard may be included. The station may further include a personal computer for voice recognition, dual tone multiple frequency signals (DTMF) decoding, local processing functions (e.g., menu functions or screen displays and controls), or use as a conventional office workstation.

Particular advantages are realized in systems according to various aspects of the present invention by implementing a participant station in a manner suitable for use by abusive users (e.g., prisoners). Such a station may include a video camera and flat screen LCD monitor installed behind a protective window; and, a telephone handset for microphone and speaker mounted with a hook switch. The hook switch provides a signal indicating that a participant intends to begin participating, continue participating, or discontinue participating in a conference. The LCD monitor may provide video from a camera or cameras at other participating stations as well as screens for instructions on operation of the station.

A conference control station supports making reservations for conferences, revising reservations for conferences, canceling reservations for conferences, and keeping records of conferences. In addition, a conference control station may provide a data entry/edit interface for managing descriptions of participants including data that may be needed for a presentation during a conference. For example, conference control stations 102 include conventional computer workstations for database management and include audio and video capabilities for participating (e.g., as an observer) in any conference (e.g., for security or troubleshooting purposes).

General purpose stations 103 may perform any mix of functions described above with reference to conference control stations 102 and conference participant stations 104.

Alternative implementations of system 100 include systems having general purpose stations for all users (hubs 108 and stations 102 and 104–106 omitted); systems having a mix of conference control stations 102 and conference participant stations (any combination of stations 104–106, hubs 108 being omitted where stations 105–106 are not included); systems having a mix of stations 102 and 103 (hubs 108 and stations 102 and 104–106 omitted); and systems having a mix of conference control stations 102 and conference participant stations (any combination of stations 104–106, hubs 108 being omitted where stations 105–106 are not included).

A hub provides a communication interface between a network link and each of a plurality of point-to-point links. The communication may provide security (e.g., encryption, fire wall functions, time locks). For example, one particular hub of hubs 108 provides communication between a conference participant station 105 and any other station of system 100 via network 101. Each station 105–106 is coupled to the particular hub of hubs 108 by an individual point-to-point link 109. Network 101 is coupled to each hub of hubs 108 via a link 101. In a preferred implementation, a hub includes a processor that, among other things, controls components and participant stations. In such an implementation, conference participant stations may operate as peripherals (e.g., dumb I/O devices) of such a processor. Consequently, processing capabilities of components and participant stations may be reduced or eliminated. Further, such a processor may perform part or all of the operations suitable for supporting use by users 113–116 as discussed above, for example, as within a local context of conference participant stations 105–106.

A conference system architecture according to various aspects of the present invention provides scalable expansion, redundancy, monitored system capabilities, responsive conference rescheduling, and distributed resources. A system architecture is a plan by which system functions are made the responsibility of particular processes or components for efficient performance of system functions and for efficient communication among processes. The system architecture is systematically applied as implementations of the system are developed and expanded. Systems employing this architecture solve the problems and provide the benefits discussed above, expand and contract without disruption of services, and exhibit extraordinary reliability.

Figure 2:
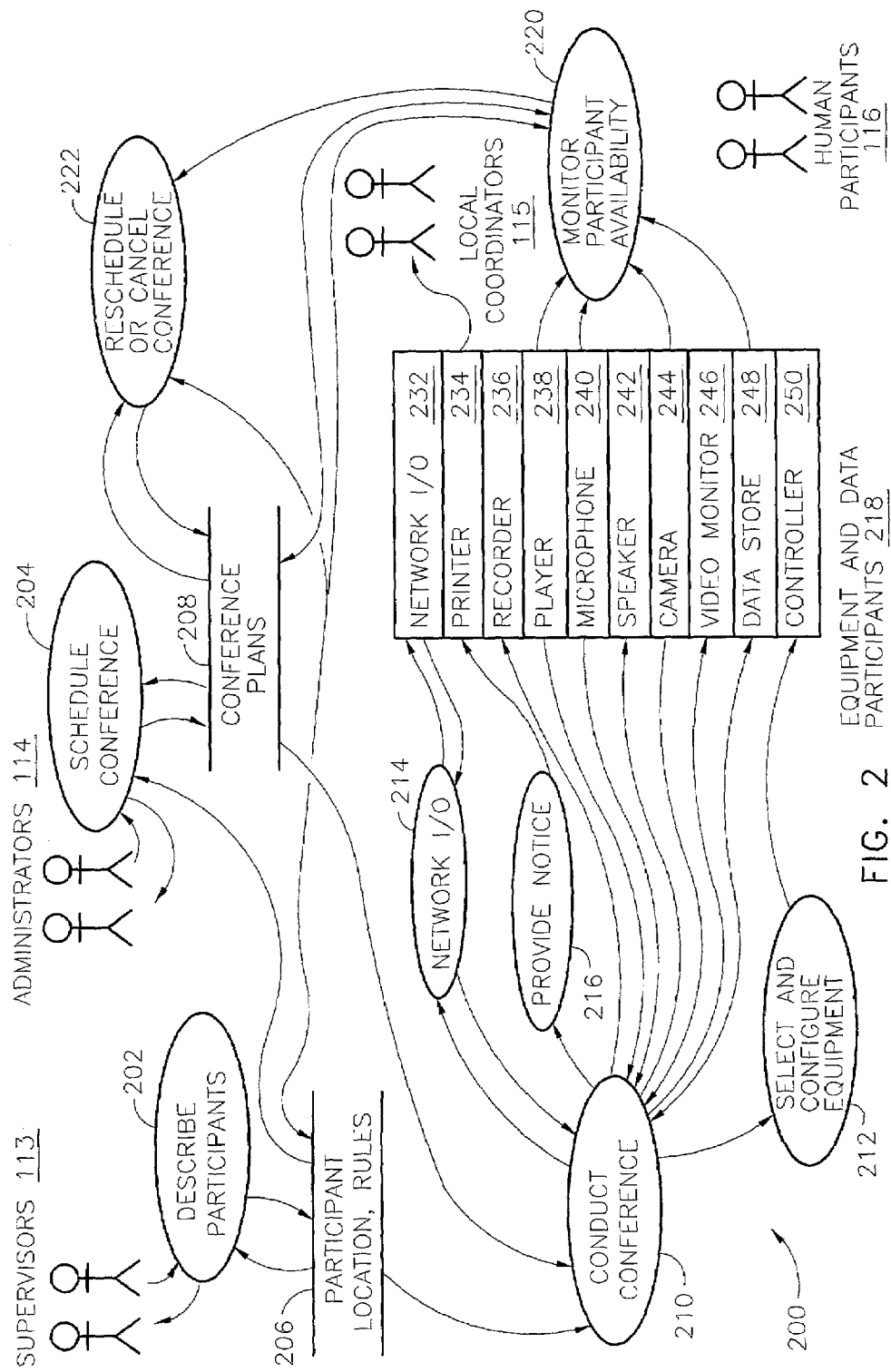
FIG. 2 is a data flow diagram for processes performed by the system of FIG. 1.

For example, system architecture 200 of FIG. 2 includes describe participants process 202, schedule conference process 204, conduct conference process 210, select and configure equipment process 212, network I/O (i.e., input/output) process 214, provide notices process 216, equipment and data participants 218, monitor participant availability process 220, and reschedule or cancel conference process 222. System architecture 200 is not restricted to particular details of any physical implementation. For example, any number of processors may perform the processes listed above. These processes may be implemented using conventional distributed processing technology (e.g., remote procedure call, client-server, or parallel processing). Such processors may be located centrally or grouped with instances of equipment 218. Processes 210, 212, and 220 may be performed in a processor of a hub. Processes 214, 216, and 222 may be performed in a processor of a hub. Data stores 206 and 208 may be separate or combined. A processor of a control station may perform processes 202, 204, 222, 214, and 216. In alternate implementations a first control station may perform process 202, a second may perform process 204, and a third (e.g., a self-service kiosk in a visitors' lobby) may perform an identification confirmation portion of process 210 and processes 214 and 216. Data flows illustrated in FIG. 2 by arrows may be implemented by common access to memory or storage of one processor, or by access, bus, or network links between processors.

Generally, a conference participant station designed for use by an individual employs one set of equipment 240–246 for exclusive use by one human participant. Such a personal conference participant station may provide exclusive use of (or a thread for) one of each of processes 210–216 and 220. All threads for one participant may be performed on a single processor to avoid supporting a multiple thread execution environment. Alternative implementations may host several threads for a number of personal conference participant stations on a single processor, for example, made part of a hub 108 serving stations 105–106.

Data used by processes of architecture 200 may be organized and stored in any conventional manner. Particular synergies are realized in systems according to various aspects of the present invention by storing participant locations and rules 206 on storage maintained for use primarily by supervisors (e.g., access and edit privileges), providing limited access (e.g., read only) to administrators, and providing barriers to access (e.g., no authorized means of access) by participants 116, 218 and coordinators 115. Additional synergies are realized by storing conference plans 208 on storage maintained for use primarily by administrators (e.g., access and edit privileges), providing limited access (e.g., read only) to coordinators 115, and providing barriers to access (e.g., no authorized means of access) by participants 116, 218.

Data storage may be centralized or distributed (e.g., mirrored, shadowed, redundant, or controlled by a directory service of the type marketed by Microsoft as Active Directory or by Novell as Network Directory Service). Distributed storage may include physical storage in any stations 102–106 and hub 108.

A describe participants process 202 maintains information about people, equipment, and data that may be designated as participants in one or more conferences. Such information may include suitable unique identification (e.g., name, serial number, path name), role of human participant, type of equipment for equipment participant, contact and other information to locate or make available the participant at a particular location, and rules for scheduling and conducting conferences. Describe participants process 202 may cooperate with storage for participant locations and rules 206 to perform all conventional functions of a database management system. Data from participant locations and rules 206 may be provided (e.g., to processes 204, 210, and 220) as a report, a response to a query, or by reference to a suitable index. Process 202 provides a conventional user interface for use by supervisors 113.

A schedule conference process 204 creates, revises, and deletes records stored in a database of conference plans 208 to establish a conference to be held at a date and time in the future. Conference plans may be maintained as a record of conferences completed (successfully through expected duration, or otherwise unsuccessfully) or cancelled. Rules referred to by process 204 from store 206 may limit participation in conference plans to described participants generally or to qualified participants (e.g., having particular attributes, prior registration, or approval). Qualification may be established by any conventional work flow or work group software. Process 204 provides a conventional user interface for use by administrators 114.

For each scheduled conference, conference plans 208 may include a unique conference identifier, a list of equipment (if any) needed at each site, station, or location; a list of participants and stations identifying which station each participant is to use (e.g., one or more participants at each identified station); a start date and time for the conference; an ending date and time for the conference; and status information posted by monitor participant availability processes 220. Conference plans 208 may include information for establishing links between participant stations via network 101, for example, identifiers (e.g., port numbers, network addresses, world wide port names) that define links, routes, gateways, and paths through network 101.

A conduct conference process 210 reviews conference plans 208 and when the start time of a conference approaches does the following in any order and during any suitable period of time: (a) identifies equipment and configurations to select and configure process 212 that may accomplish selection and configuration of equipment 218 via controller 250; (b) directs network I/O process 214 to establish or assure links 101 via network I/O circuits 232 will be effective for the conference; (c) confirms identification of human participants prior to allowing participation; and (d) directs provide notice process 216 to provide notice of the upcoming conference to a coordinator 115 or to a participant 116. These functions may be distributed for performance by processors near the participants or participant stations. These functions may be performed in any combination by several separate processors (e.g., function (b) on a processor separate from function (c)). Cooperation between processors may effect security (e.g., access limits, fire walls, encryption). Notice may be provided by a computer screen display, via network 101 (e.g., email), or by a printer 234. Preferably, notice is provided by a printed report (e.g., all conferences for the day, or all conferences for a particular station for a period of time), a printed directive (e.g., a handbill, receipt, or ticket), or a message as discussed above. Notice conveys information to a coordinator or an individual human participant as to where to go and what station to use to be part of a particular conference to which the participant was scheduled to attend.

A monitor participant availability process 220 performs tests on equipment 218 and reviews data in participant locations and rules 206 to determine whether data and equipment participants and human participants (collectively 116 and 118) will be available to participate in a conference according to a conference plan 208. In the event that any participant will be, is, or becomes unavailable, monitor participant availability process 220 posts status in participant locations and rules 206 and/or conference plans 208. Equipment may be determined to be unavailable if a signal line from the equipment has an unsatisfactory signal on it during a test period. For example, the following are unsatisfactory: player 238 provides no signal, microphone 240 provides too much noise or no signal (e.g., open circuit), camera 244 provides no sync, too much noise, or no signal (e.g., open circuit), or a file of data store 248 does not exist or cannot be accessed.

A reschedule or cancel conference process 222 responds to status posted by monitor participant availability processes 220 to detect a planned conference that should be rescheduled (e.g., one or more participants are unavailable). Rescheduling may be accomplished prior to the beginning of a conference or during a conference. When a station (or a part of a station, e.g., a data or equipment participant) malfunctions, the station may be rendered unavailable until repaired. All conferences associated with the station until a predicted time the station will return to service may be rescheduled to use an alternate station. Preferably an alternate participant (human or equipment) will be located convenient to the affected human participants. Convenience may be assessed in terms of a forecast allowance of time to change locations of the participant to the desired location according to the rescheduled conference. If no suitable alternative is available at the desired rescheduled conference time, the original conference may be cancelled with notice provided to affected users 113–116.

Figure 3:
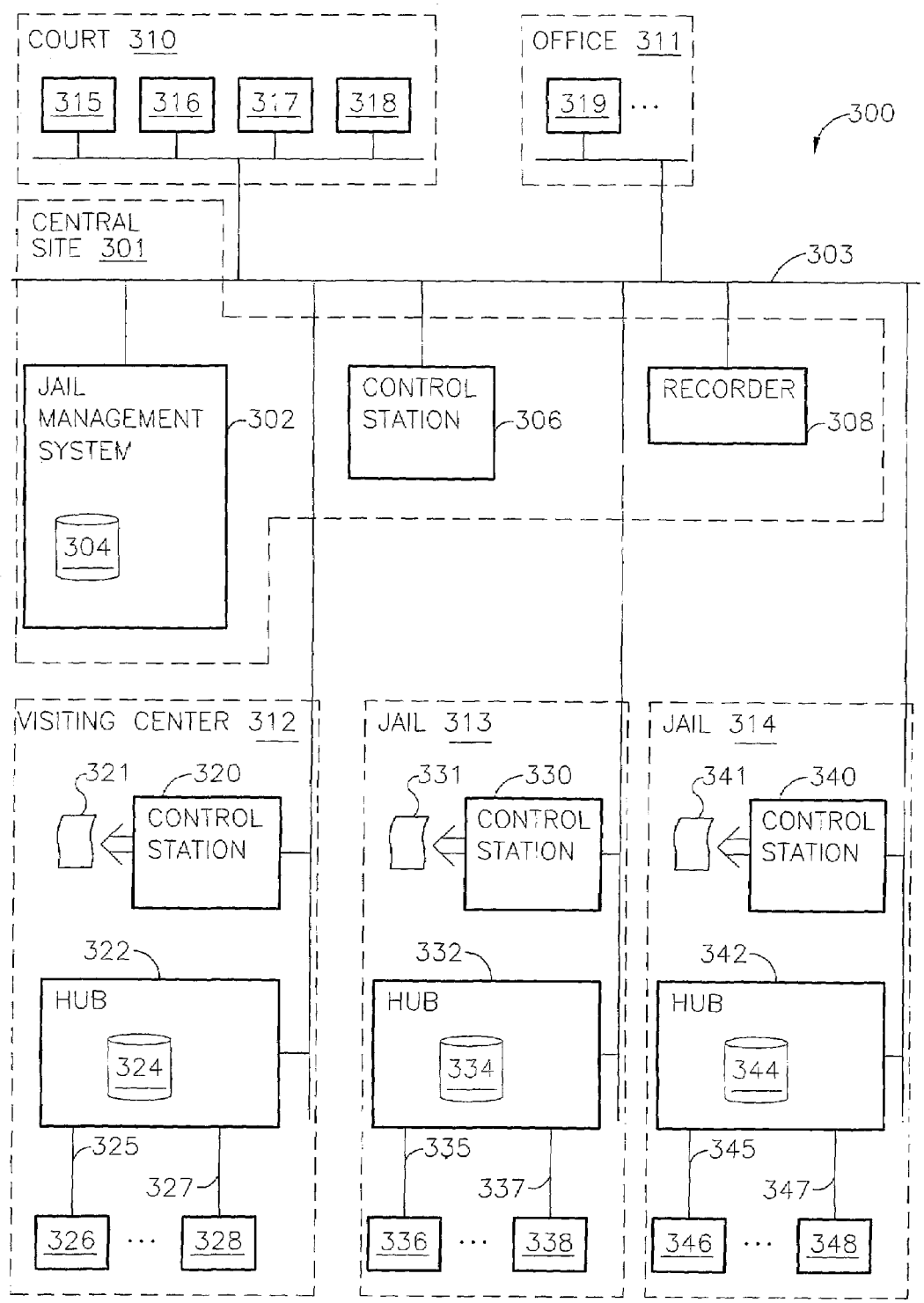
FIG. 3 is a functional block diagram of an implementation of the video conferencing system of FIG. 1.

A video conference system according to system architecture 200 provides reliable video conferencing involving prisoners. For example, prisoner visitation system 300 of FIGS. 2–4 includes stations at six sites: central site 301, court 310, office 311, visiting center 312, jail 313, and jail 314. Each site of system 300 includes numerous stations organized within a physical boundary (e.g., a court room 310), organized within a political organization (e.g., a department of an office 311), organized for convenience of installing system components (e.g., different security conditions for visiting center 312 and for jail 313), and organized for achieving system budgets or efficiencies with hubs in particular areas. Alternate implementations of system 300 include any number of sites and any number of stations per site. Sites may be in separate physical locations.

Central site 301 includes jail management system 302, conference control station 306, and recorder 308. Network 303 provides conventional digital communication among sites using Ethernet and ATM technologies as discussed with reference to network 101 above. Broadband technology for network 303 is preferred.

A jail management system includes any system that provides prisoner information regarding the identity and location of prisoners. A jail management system may provide information regarding limits (e.g., rules) on whom the prisoner may confer with. Further, a jail management system may include any other data suitable for operating a jail, prison, or penitentiary. For example, jail management system 302 includes a conventional computer system (coupled for digital communication via network 303) and a database 304. The computer system may be operated by a supervisor to operate any conventional database management system governing database 304 including a user GUI for entry/edit of data stored in database 304, for defining queries, and for viewing and reporting data of database 304. Database 304 in one implementation includes tuples (e.g., associations of data item values) as described in Table 1.

TABLE 1

| Tuple | Description |
|---|---|
| prisoner name, prisoner location, date-time | Current location; itinerary of planned other locations; history of past locations; may include alternate future locations for the same prisoner name and date-time; |
| prisoner name, visitor name, permitted activity, beginning date-time, ending date-time | A permitted activity may include a conference (or visit) of a type defined by rules; requested or approved visitors are indicated for each particular prisoner; visitor may be identified by a role as family member, friend, business associate, clergy, and legal counsel; particular visitors may have limitations on privileges to visit another particular prisoner; |
| visitor name, contact information, description of visiting rights for next period, description of visiting rights remaining in the current period, definition of period | Facilitates contacting visitor about grants, withdrawals, and use of visiting rights |
| prisoner name, date-time of report, date-time of incident, comment on behavior | Facilitates changes in visiting privileges |
| visitor name, date-time of report, date-time of incident, comment on behavior | Facilitates changes in visiting rights |

Jail management system 302 implements process 202 and participant location and rules 206 as discussed above.

Conference control station 306 performs functions discussed above with reference to conference control station 102. Conference control station 306 may be operated by an administrator as discussed above.

Recorder 308 may be a multichannel recording device for recording any number of simultaneous conferences in whole or in part. One or more channels of recorder 308 may be specified as participants in a conference. If channels are not available, substitute channels may be used as a consequence of rescheduling as discussed above. Recorder 308 may provide an archive for conference recordings made at other sites. Transfer of date to recorder 308 may be automatic according to a scheduled backup operation or as requested by a person authorized to determine whether an archive is desirable. Authorizing may be limited by a rule to a person that was a participant of the conference recording to be archived.

In an alternate implementation, a hub (e.g., like 322) and one or more participant stations are used in place of recorder 308. The hub having a built-in recording capability also supports monitoring of recorded material (e.g., for review, or during recording). Monitoring may be accomplished covertly in any conference, for example, by one or more of a group of intelligence officers. Covert recording (e.g., of clergy) or monitoring may be scheduled on control station 306 when permitted by or consistent with suitable records of jail management system 302 (e.g., a flag associated with a conference or human participant set in response to a warrant, a court order, or a grant).

Court 310 includes conference participant stations for a judge 315, prosecutor 316, defense attorney 317, and witness 318. A projection system and public address system may be equipment participants to facilitate attendance by a jury.

Office 311 includes any number of general purpose stations 319. Each station may be implemented with a conference participant station or a conventional desktop computer, operating system, software, and peripherals capable of functions supporting a conference participant as discussed above. A general purpose station may be used by a supervisor, an administrator, or a participant. As an administrator, the user may unobtrusively observe or record a video conference (e.g., for security, operations research, training, or system management purposes). With suitable software and peripherals, a general purpose station may also be used as a source of programming to be provided during the video conference; or, as a recorder of any portion of a video conference.

Visiting center 312 includes conference control station 320 coupled to network 303, any number of participant stations 326, 328; and hub 322 that couples participant stations to network 303. Hub 322 includes database 324, generally for operations local to visiting center 312. Control station 320 may be used by an administrator or a coordinator to make or revise reservations, issue notices 321 regarding a conference, or perform local system management functions. A hub may support a local terminal with GUI (not shown) that may be used in place of control station 320 to reduce reliance on network 303.

Jail 313 (and 314) includes any number of conference participant stations 336, 338 (346, 348); hub 332 (342) that couples stations to network 303; and conference control station 330 (340) that is also coupled to network 303. Hub 332 (342) includes a database 334 (344) for operations local to jail 313 (314). Control station 330 (340) may be used by an administrator or a coordinator to make or revise reservations, issue notices 331 (341) regarding a conference, or perform local system management functions. Each hub 332 (342) may support a local terminal with GUI (not shown) that may be used in place of control station 303 (340) to reduce reliance on network 303. In an alternate implementation, some of conference participant stations 336–338 are located in a secure area of the jail for use by visitors. Visiting center 312 may be omitted.

A conference may include any number of stations at any number of sites. The stations, participants, and any other system capabilities reserved for a conference may be revised before a conference. Suitable revisions to stations, participants, and any other system capabilities in use or reserved for a conference may be revised during a conference. A new conference may be reserved or begun that is modeled in full or in part after a reserved conference, a conference that is in progress, a conference that has been cancelled, or a conference that has been completed. For example, a video conference may include prisoners at jails 313 and 314 using station 336 and 348 in a video lineup for identification by a witness at station 318, with review and participation by attorneys at stations 316 and 317, a judge at station 315, and an expert at station 319. In another example, an attorney, clergyman, or family member may arrive at visiting center 312, be directed to a station 326 by notice 321, and confer in a series of scheduled conferences with prisoners in jails 313 and 314. Each conference may include notice 331 to a guard who directs or escorts a prisoner to a particular station 336 without having to transport the prisoner outside the jail (or outside a cell block or cell where a particular station has been installed). If the participant station is located in a cell, the guard may merely assure that the prisoner is aware of the conference and how to participate.

In a preferred embodiment, conference participant stations 326, 328, 336, 338, 346, and 348 are implemented for maximum mechanical durability and minimum complexity to reduce the cost of expected vandalism and aggressive behavior of participants. In such an implementation, each station includes a monitor (e.g., providing an SVGA interface), a camera (e.g., providing a USB interface), a microphone (providing an analog line level interface), a speaker (providing an analog interface for setting volume at the hub), and a hook switch (e.g., a proximity switch having no moving parts) for the microphone-speaker hand set. Each participant station may be connected by separate cables (e.g., point-to-point) to each interface of a hub. In one implementation a hub supports up to 20 conference participant stations. Conference participant stations may be arranged one per cell or site; or, in groups of stations per site serving a large number of visitors (e.g., at site 312) or prisoners (e.g., at site 313 and 314) with minimum staff to coordinate use by visitors (e.g., a receptionist) and prisoners (e.g., a unit guard).

A hub may perform network bridge and gateway functions implemented using circuits for signal switching (e.g., discrete audio and video signals; analog, serial, or parallel digital signals) and circuits for packet switching. Packet switching (e.g., as used with network 303) allows each hub to operate as a slave of a control station; or as an initiator for peer-to-peer communication among hubs. Peer-to-peer communication may facilitate monitoring (e.g., aggregating availability results to determine whether to cancel a conference) and rescheduling (e.g., if a suitable alternate participant is served under another hub) as discussed above. Analog switching may be used with analog tests to simplify monitoring functions discussed above.

Figure 4:
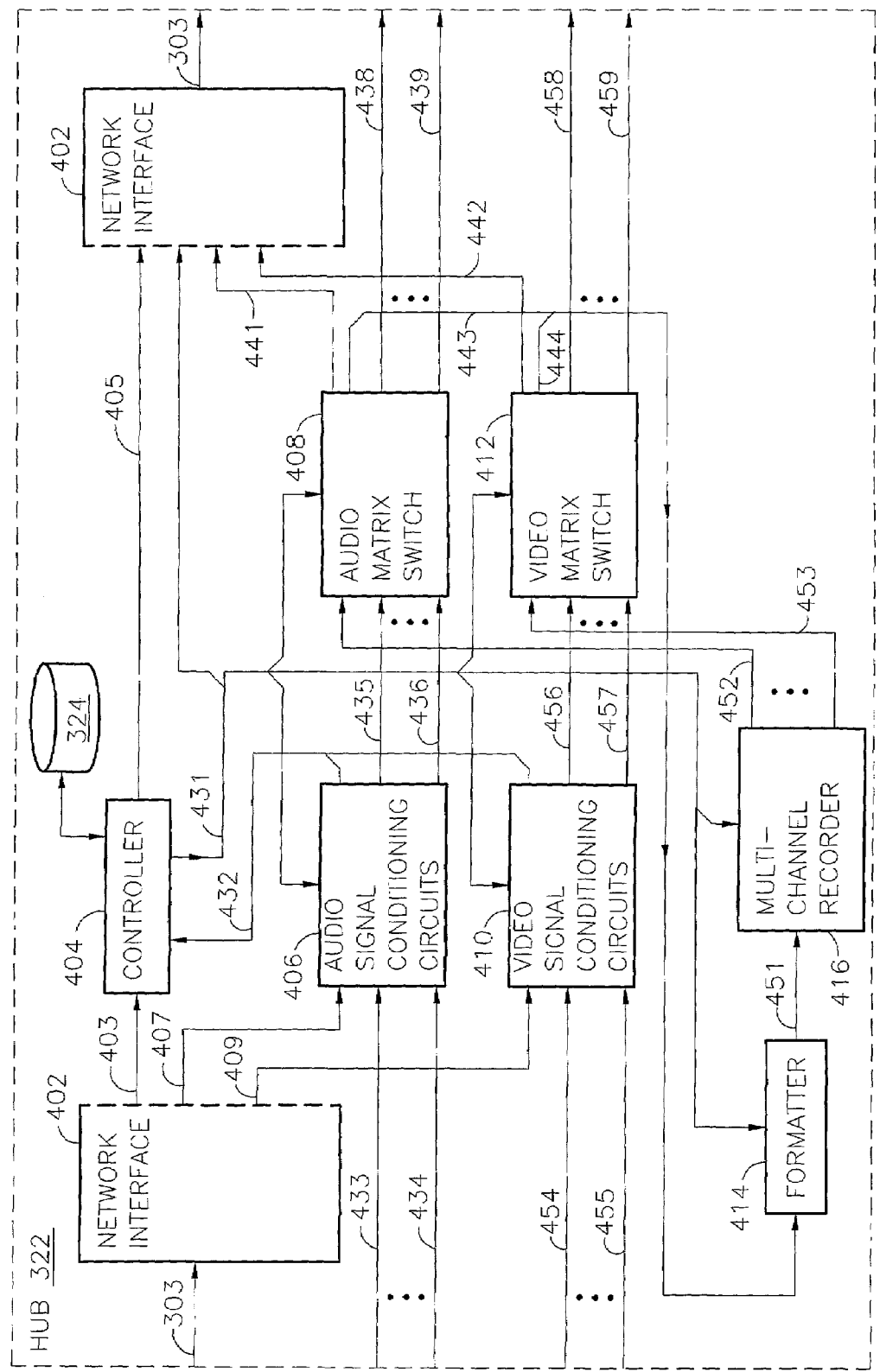
FIG. 4 is a functional block diagram of a switch used in the video conferencing system of FIG. 3.

For example, hub 322 of FIG. 4 includes network interface 402, controller 404, audio signal conditioning circuits 406, audio matrix switch 408, video signal conditioning circuits 410, video matrix switch 412, formatter 414, and multichannel recorder 416. Hubs 334 and 344 may be of the same type.

Network interface 402 implements functions discussed above with reference to network I/O process 214 and network I/O hardware 232. Input packets from network 303 are parsed and provided by network interface 402 to controller 404 on line 403 as commands and data (e.g., from a conference control station, or peer hub controller). Controller 404 provides commands and data (e.g., replies, status, and commands to peers) on line 405 to network interface 402 for submitting as packets on network 303. Both input and output packets may include network addresses. Input packets not bearing an address corresponding to this hub are ignored. Output packet addresses may specify the intended recipient (e.g., hub or control station). Network interface 402 may include digitizing circuits for converting analog signals on lines 441 to digital to be included in packets conveyed on network 101. Network interface 402 further includes digitizing circuits for converting video signals on lines 442 to digital to be included in packets conveyed on network 101.

A controller 404 may perform processes in cooperation with database 324 corresponding to schedule conference process 204, conduct conference 210, select and configure equipment process 212 (e.g., typically limited to equipment at the same site as the hub), network I/O process 214, monitor participant availability process 220 (e.g., typically limited to participants at the same site as the hub), and reschedule or cancel conference process 222 (e.g., initiation action to reschedule participants among same site stations and equipment, and requesting cancellation to be accomplished by a control station that may have efficient access to information to determine whether additional alternatives should be considered before effecting a cancellation). Some monitoring functions may be accomplished in hardware (e.g., part of signal conditioning circuits). By distributing portions of the scheduling and rescheduling processes among hub controllers, reservations for conferences are made and maintained using scalable and distributed computing techniques. Controller 404 may include database management functions to synchronize the data kept on database 324 with data kept on peer hub controllers, control stations, and jail management system 302.

Controller 404 provides control signals 431 to implement select and configure equipment process 212. Control signals 431 may be any conventional signals including a parallel data bus, a serial data bus, and dedicated discrete control lines. Control signals 431 are directed to network interface 402, audio signal conditioning circuits 406, audio matrix switch 408, video signal conditioning circuits 410, video matrix switch 412, formatter 414, and multichannel recorder 416. Control signals 431 to network interface 402 may specify packet switching and routing functions to implement any data path (e.g., a link) between a station 326, 328 and network 303. Typically, such a path includes (a) an input port for receiving packets to be presented on a speaker or a video monitor; and (b) an output port for sending packets developed from a microphone or camera. Implementation of a path includes opening an input port, opening an output port, and associating the ports with signals of a particular station. For example, a first network address (e.g., a physical port number, an IP address) is associated with lines 438 and 458 to station 326. The same or a second network address is associated with lines 433 and 454 from station 326. When an input port is closed, packets bearing the first network address are ignored by this controller. When an output port is closed, no further packets bearing the second network address are prepared or sent. Typically, ports are opened at a conference start time, remain open for one conference, and are closed when the conference terminates for any reason.

Each station 326 provides an input audio signal 433, and an input video signal 454. Each station 326 receives an output audio signal 438 (e.g., combined audio from all stations of the conference, or audio as directed from time to time by rules of the conference) and an output video signal 458 (e.g., one camera image, a formatted picture-in-picture formed from video from several stations of the conference, or screens as directed from time to time by rules of the conference).

Status signals on line 432 are input to controller 404 for determining availability of stations 326, 328. For example, each conference participant station 326 (328) provides an analog audio signal 433 (434) from a microphone (e.g., a line level signal). Audio conditioning circuits 406 may include a comparator for each line level signal, comparing the signal amplitude to a minimum threshold value (e.g., a wide band, band limited, or signal to noise evaluation). If the signal received on line 433 (434) is below the threshold, the associated station is reported unavailable on line 432. Each conference participant station 326 (328) provides a signal 454 (455) from a camera (e.g., scanner output signals and sync signals in any conventional format) that may be analyzed for suitable variation or consistent signal attributes to distinguish "weak or no picture", "weak or no synchronization", "weak or no color signal", or "too much noise". If any of these conditions persist, video conditioning circuits 410 may report on line 432 that the camera of the associated station is unavailable.

For each input channel 433 (434), output conditioned signals 435a and 435b (436a and 436b) are provided to audio matrix switch 408. Audio signal conditioning circuits 406 may provide an audio signal 435a delayed with respect to audio signal 433 to synchronize with a video signal on line 433 by introducing a suitable signal conditioning delay in accordance with control signals 431. In addition, any conventional audio signal conditioning may be implemented (e.g., amplification, band limiting, equalization). Audio signal conditioning circuits 406 also provide combination audio signal 435b that includes audio 407 received via network 101 (e.g., addressed to a particular port of circuit 406) generated from other participating stations of the conference.

Audio matrix switch 408 includes a conventional crossbar switch for coupling any input line 435 to any output line 438–439 in accordance with control signals 431. The conditioned audio signal 435a may be routed to network interface 402 for use in audio conditioning circuits of participating stations (e.g., there forming a composite audio signal of all stations of the conference). The combination audio signal 435b may be routed to one or more participating stations in accordance with control signals 431. Either or both signals 435a and 435b may be routed to channels of formatter 414 in accordance with control signals 431.

For each input channel 454, output conditioned signals 456a and 456b are provided to video matrix switch 408. Video signal conditioning circuits 410 may provide a video signal 456a via any conventional video signal conditioning (e.g., amplification, band limiting, color balanced, special effects). Video signal conditioning circuits 410 also provide combination video signal 456b that includes video 409 received via network 101 (e.g., addressed to a particular port of circuit 410) generated from other participating stations of the conference.

Video matrix switch 412 includes a conventional crossbar switch for coupling any input line 456 to any output line 458–459 in accordance with control signals 431. The conditioned video signal 456a may be routed to network interface 402 for use in video conditioning circuits of participating stations (e.g., there forming a composite video signal of all stations of the conference). The combination video signal 456b may be routed to one or more participating stations in accordance with control signals 431. Either or both signals 456a and 456b may be routed to channels of formatter 414 in accordance with control signals 431.

For each video conference to be recorded, up to the limit of the number of channels of multichannel recorder 416, formatter 414 composes a program representing a selection and combination of audio and video signals using conventional signal formatting techniques such as picture in picture, selection of the picture corresponding to the speaker, and summation (or maintaining separate) audio signals that have been synchronized to the corresponding video image of the speaker. Each such program is formatted in accordance with control signals 431 and provided to multichannel recorder 416 on line 451.

Multichannel recorder 416 accepts formatted signals on line 451 and records such signals on channels designated by control signals 431. More than one channel may be designated for one teleconference. Playback of one or more channels (e.g., for one or more video conferences) via lines 452–453 may be directed through matrix switches 408 and 412 for presentation on any station of system 300. Any conventional removable or nonremovable media may be used.

Playback is typically scheduled as a conference involving one or more particular recorder channels and at least one participant station for viewing the playback. Playback may also be part of a presentation in another video conference by including one or more channels of recorder 416 as equipment participants. If the media is separated from the recorder, a playback conference may include a data participant by specifying an identifier of the recording for playback (e.g., identified by a conference identifier, a recorded media identifier, or a filename).

A method for making a conference reservation according to various aspects of the present invention records one or more tuples described in Table 2.

TABLE 2

| Tuple | Description |
| --- | --- |
| Conference identifier, start date-time, end date-time, status | The system may assign a conference identifier to facilitate identifying numerous tuples below with the same conference identifier. Any specification of the beginning and duration of the conference may be made. The duration of the conference may be specified or calculated. In one implementation, it is assumed that all participants participate for the entire duration of the conference, one duration being specified for all. In an alternate implementation, each participant participates for a specified duration (i.e., respective start and end times for each participant) and the conference end date-time is the latest of all participants. |
| Conference identifier, participant identifier, participant needed at location, participant | A participant may be a person, a piece of equipment, or a data item. When a human participant is identified with the same location as an equipment participant, the person may be assumed to be operating (perhaps exclusively) the equipment. For |

TABLE 2-continued

| Tuple | Description |
| --- | --- |
| current location, transit time allowance, contact information for use to notify participant | example, to assign a person to a single user conference participant station, the person tuple will have the same needed at location identifier as the station tuple. Current location (e.g., for inmates) may be tracked and available to the process that schedules conferences. If omitted, transit time allowance may also be omitted. The times at which notices are provided may account for a transit time allowance. Notice may be given to someone other than the participant (e.g., a coordinator, escort, guard). |
| Conference identifier, participant identifier, participant rank | Rescheduling of a conference may be initiated on condition that the unavailability of one or more high ranking participants makes the conference ineffective. In one implementation all participants are considered critical and individual rank is omitted. In another implementation, lower rank assigned to an observer allows the observer to be unavailable without initiating rescheduling. In another application, if a quorum of same rank participants are available, the conference will not be rescheduled. |
| Conference identifier, participant identifier, last tested date-time, test procedure | Availability of a conference participant may be tested with criteria suitable for the type or identify of a participant. For example, the equipment of a conference participant station may be tested for its ability to produce suitable audio and video signals. |
| Participant identifier, business rule, parameters for evaluating business rule | This tuple may be used for defining constraints for any function of a conference system according to various aspects of the present invention. For example, a business rule in this context includes any test that affects accepting a request for scheduling, scheduling, notifying, testing unavailability, or rescheduling. The business rule may be expressed in any conventional manner (e.g., a pointer or suitable identifier of a script or program). The business rule may be omitted from the tuple if implied by the business rule parameters. Parameters may include one or more descriptors of the participant, one or more limits to be applied, or parameters defining how the business rule is to be applied (e.g., when to re-evaluate, consequences of particular results of applying the rule, or exceptional handling procedures). The business rule may be evaluated prior to accepting a request to schedule a conference, or evaluated one or more times prior to the conference. |

A method for scheduling a video conference may include determining locations where conference participants are needed to participate in the conference; determining a period of time during which the conference will be held; determining a conference identifier; and storing one or more tuples as described in Table 2. Further, the method may include any one or more of the following operations for assuring that a conference will proceed with suitable participants during a period of the conference by: (a) notifying the participant, an agent for the participant, or a coordinator to cooperate with the participant; (b) allowing transit time for the participant; (c) testing the participant's availability prior to or during the conference; (d) rescheduling an alternate participant prior to or during a conference if an initial participant is expected to be unavailable or becomes unavailable during the period for the conference; (e) rescheduling the conference if the available participants do not satisfy a rule; (f) notifying participant(s) affected by the rescheduling; and (g) coordinating the co-location of participants (e.g., directing a human participant to a particular conference station equipment participant) prior to or during the conference. When scheduling is accomplished with cooperation of processors coupled for communication via a network, each scheduling process may accomplish one or more of the operations discussed above and communicate requests or results to the other processors.

Figure 5:
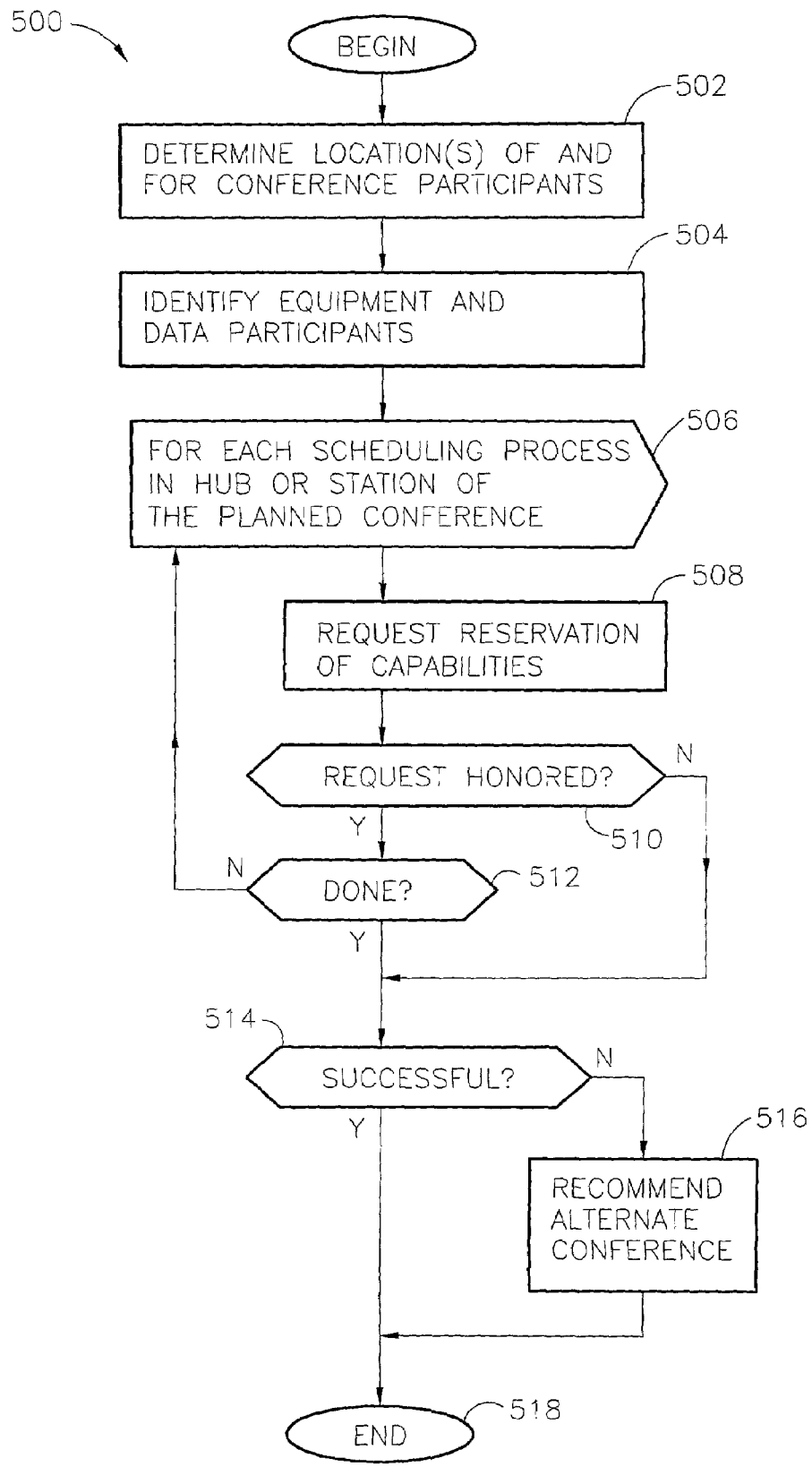
FIG. 5 is a process flow diagram of a method for making a reservation according to various aspects of the present invention.
Figure 6:
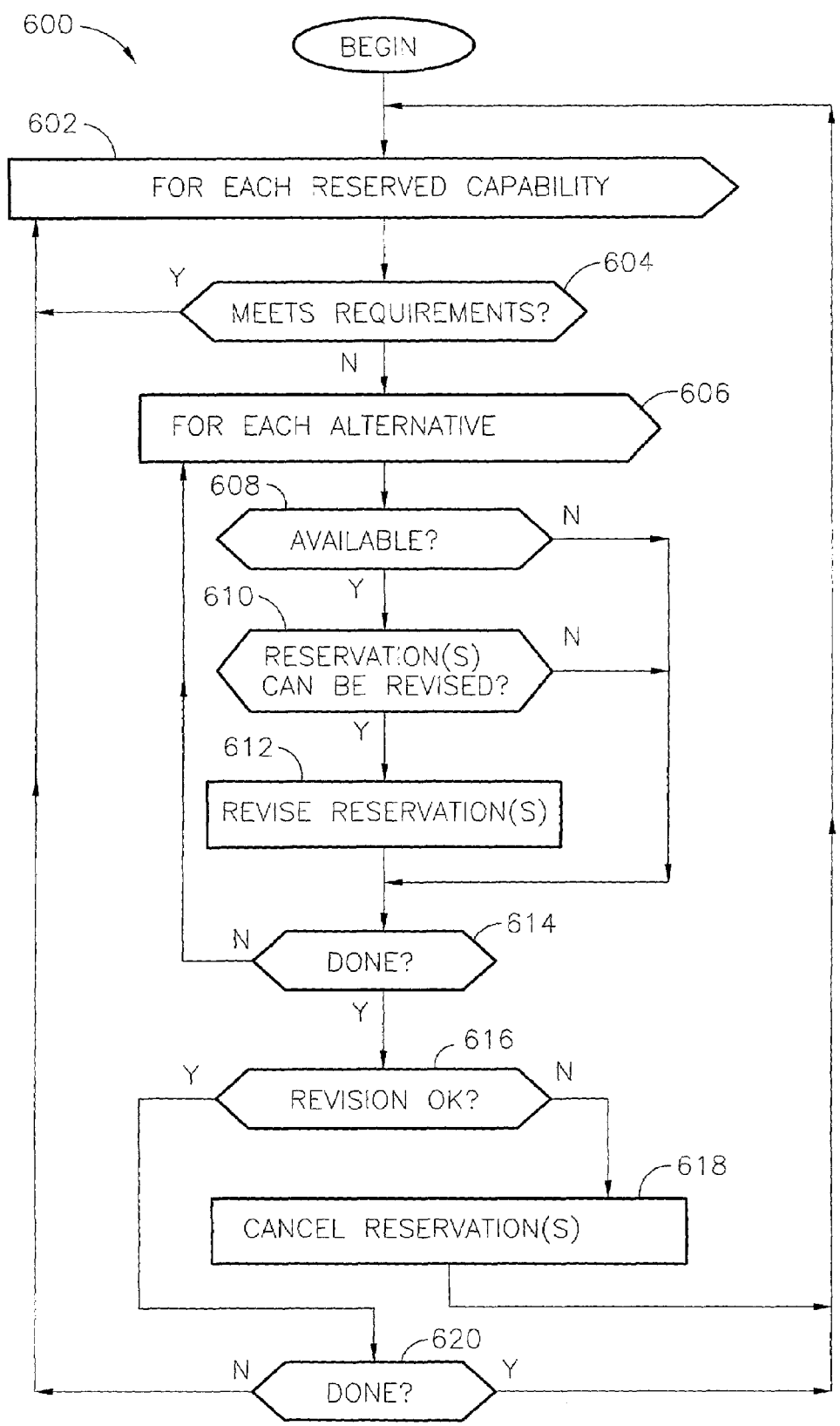
FIG. 6 is a process flow diagram of a method for revising reservations according to various aspects of the present invention.

For example, method 500 of FIG. 5 proceeds as follows. Location information (e.g., current nonconference location, planned conference location, location for availability testing, location for notification, location for coordination such as a lobby) is determined (502) of or for intended conference participants. Equipment and data for the conference is identified (504) to the conference. For each scheduling process (e.g., in a hub, control station, or general purpose station) related to the conference and planned capability (e.g., participant, network infrastructure such as capacity, network addresses, channel numbers, port numbers), a reservation of capabilities is requested (508); a determination is made (510) whether the request is honored; if not honored the reservation is considered unsuccessful; and if honored, each other (512) scheduling process and planned capability is considered. After considering (514) a dishonored request or after considering all capabilities, requesting is considered successful, the scheduling operation is considered complete (518); and otherwise, a recommendation is made (516) for a conference involving an alternate capability (e.g., different time, different location, different participant). The determination (510) may employ any conventional scheduling algorithm or an algorithm of the type discussed below.

Methods according to various aspects of the present invention increase the likelihood that a participant will be available for a conference. For example, method 600 of FIG.

6 proceeds as follows. For each (602) scheduled participant or capability related to a particular conference: it is determined (604) whether the participant or capability meets a rule that has been associated with the participant or capability (e.g., by reference in a tuple, by implied from type of participant or capability, or as a consequence that participants and capabilities are generally subject to the rule); if so the next one is considered (602); if not, alternatives are considered (606); if a schedule revision is completed satisfactorily (616), the next participant or capability is considered until all scheduled participants and capabilities related to a particular conference have been considered (620); otherwise one or more conferences are cancelled, freeing all participants and capabilities for the conference period (618). Alternatives are considered (606) as follows: it is determined whether the alternative participant or capability is available (608) at the time needed for the conference; if not, another alternative is considered until all have been considered (614); if so, it is determined whether the subject conference schedule can be revised (610) to include the alternate; if so, the schedule is revised (612); and if not, another alternative is considered until all have been considered (614). More than one conference schedule may be affected by a determination that a particular participant or capability is unavailable (608). If the same participant or capability is included in other conferences, revision to those conference schedules is considered (610) and accomplished (612). By revising one conference schedule (e.g., canceling the conference), alternatives become available for consideration.

Figure 7A:
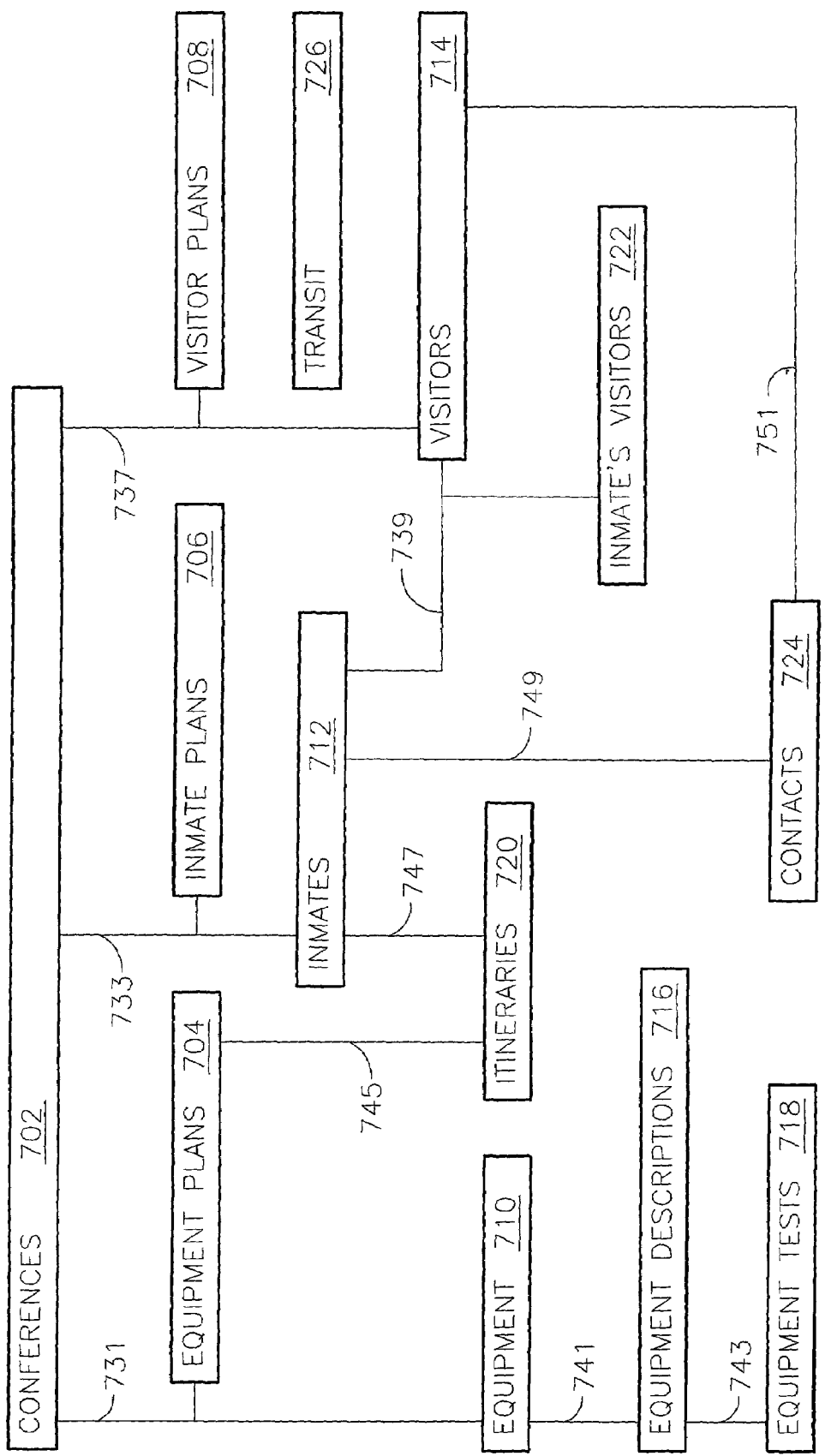

A data structure according to various aspects of the present invention may be referred to by any process that schedules, conducts, monitors availability, or reschedules conferences, to complete an operation of such a process, as discussed above. A database may include lists of records having the same structure (e.g., values for the same purpose indicated by a field name). Any two or more values of a data structure (e.g., a record) comprise a tuple by implementing an association (e.g. a relationship) between the values. For example, a database 700 of FIGS. 7A–7N for use by system 300 implements participant locations and rules 206 and conference plans 208 and may be stored in part on jail management system 304, control station 306, and stores 324, 334, and 344 as discussed above. Database 700 includes lists of records for conferences 702, equipment plans 704, inmate plans 706, visitor plans 708, equipment 710, inmates 712, visitors 714, equipment descriptions 716, equipment tests 718, itineraries 720, inmate's visitors 722, contacts 724, and transit times 726. Fields of the records of each list are described in Table 3.

TABLE 3

| Field | Description |
| --- | --- |
| Conference ID | A unique identifier for every conference past, present, and future. Records may be maintained in database 700 for past conferences for reference and for use as patterns for the simple scheduling of similar new conferences. |
| Conference start date-time | The period of a conference may be stated as a start time and duration or as a start time and an end time. |
| Conference end date-time | The period that a conference was or will be held terminates with the end date-time. |
| Status: Requested | The associated conference ID identifies a conference that has been requested but has not yet been confirmed because the status of a participant is not yet confirmed. When an administrator posts a conference record in 502 with associated equipment plans, inmate plans and visitor plans, requests (508) may be sent to other processes (e.g., hubs) and the results (510, 514) posted in due course. A requested conference that is not confirmed in a reasonable time may be withdrawn or cancelled. |
| Status: Confirmed | The associated conference ID identifies a conference that has all of its participants confirmed. A participant is confirmed if it is likely to be available at the time and location needed. |
| Status: Ready | The associated conference ID identifies a conference that has passed a date-time in advance of its conference start time and a suitable number of participants have been tested as available. If sufficient high rank participants are not available, the conference status will proceed from confirmed to cancelled. |
| Status: In-progress | The associated conference ID identifies a conference that is being held among some or all of its scheduled participants. |
| Status: Reconnecting | The associated conference ID identifies a conference in which a participant or capability became unavailable. Processes 220 and 222 may cooperate to reestablish availability of this participant or capability or reschedule an alternate participant or capability into an ongoing conference. Such rescheduling is accomplished without interfering with the ongoing conference. For example, if a first single user participant station goes unavailable (e.g., suddenly no audio signal from the station) and a nearby second single user participant station is available, a local coordinator may receive notice to direct the human participant to the second station. |
| Status: Completed | The associated conference ID identifies a conference that was started. The conference for any reason may not have run to its end date-time. A completion record may be added to database 700 in an alternate implementation for collecting quality control information such as a reason for not using the entire allotted time. |
| Status: Cancelled | The associated conference ID identifies a conference that was not held at all. Therefore, no recording is associated with this conference ID in any event. A cancellation record may be added to database 700 in an alternate implementation for collecting quality control information such |

TABLE 3-continued

| Field | Description |
| --- | --- |
| | as a reason for the cancellation. |
| Rules | Information stored in the form of data (e.g., equipment settings, addresses, or permissions) or procedural constructs (e.g., conditions, statements, scripts, entry points for processes) that may specify initial configurations, permitted operations, or revisions to the conference for one or more participants. |
| Equipment ID | A unique identifier of a piece of equipment that may be used in a conference. A station may include several equipment IDs to identify portions of the station that are unavailable. A station (e.g., a portable station) may have a single equipment identifier for simplicity of scheduling. |
| Availability | A rule or reference to a list of dates and times that the participant is available for a conference. Scheduling and rescheduling processes may refer to availability as defined by this field value (and possibly to conferences that are already scheduled for this participant that are not reflected in this availability field value) to determine availability for a particular conference request. |
| Participant rank | Rank may be a numeric value on a scale with higher numbers indicating a stronger need to participate in the conference and lower numbers indicating participation is less important, perhaps immaterial to the conference. Used, for example, to determine whether unavailability without an available alternate should effect cancellation of the conference. |
| Needed at location | The location where a participant participates in the conference. If multiple participant stations are located in a group (e.g., visitors center), the needed at location specifies one of the participant stations. A station may be specified by a physical location and by a network address. The network address may be the current address associated with the physical location of the station (e.g., one or more addresses resulting from a fabric, port, process, or user log-in operation). |
| Transit time allowance | An amount of time allowed for a participant to be made ready to participate in a conference. Transit time allowance may account for time for equipment tear-down and set-up, transportation, escort, and passage through intervening check points. May result from a lookup on transit times 526 between a from and to location. Used for example to reschedule a participant to an alternate station if the originally scheduled station becomes unavailable. In this example the transit time would be the time from the original station location to the alternate station location. If a prisoner must be escorted from the prisoner's current location to the location of the conference, transit time allowance may be used to calculate a suitable time for providing a final notice to the escort. Transit time is accommodated during scheduling and may be the basis for denying a request. Changes in transit time for a conference participant may give rise to rescheduling the provision of notices or rescheduling conferences. |
| Equipment type | Used to select alternatives. |
| Current equipment location | Locations may be specified on a grid, as a unique named location (e.g., landmark), or as "with" a second equipment identifier. |
| On/Off line flag | Equipment is on-line when it is available and is off-line when awaiting or undergoing repair. |
| Date-time back in service | Equipment that has become unavailable may be accorded a date and time estimate of when it can be relied upon for scheduling future conferences or used as an alternate in future conferences. |
| Date-time last tested | The difference between the date-time last tested and the date-time of a future conference may trigger a test to be run. |
| Maximum period between tests | Equipment may be tested in proportion to the extent of reliance on the equipment. No interfering tests may be frequent during a conference. A business rule may revise this value based on any combination of indications of reliance on a particular piece of equipment. |
| Equipment description | Equipment of the same type may have reference information associated with it to indicate factors affecting its reliability, for example, make, model, year purchased, hours in use, service and repairs. |
| Test procedures | Used to perform a test. The test procedure may automatic or manual: built-in, a pointer to a script, a program, a document for a manual test. |
| Test parameters, limits | Parameters include settings and configuration for making a measurement of a test variable to be compared to a limit. Limits include threshold values for tested signals define pass fail conditions. |
| Name | A unique identifier for a person. Where the person's given name is not unique, any additional identification may be used in addition or in place of the given name. |
| Current location | For a prisoner, the location of the last check in. For equipment, the location where it is expected to be ready for transportation to an upcoming conference. |
| Date-time of last check-in | The date and time when a check-in of the prisoner was completed successfully. |
| Maximum period between check-ins | Different types of confinement may allow variation in the period between check-ins. If a check-in does not occur, the prisoner is |

TABLE 3-continued

| Field | Description |
|---|---|
| | unavailable. Notice of a conference is preferably provided to a coordinator at a suitable time prior to an expected check-in. |
| Vehicle | An identifier that serves as a proxy for a location. |
| Transport purpose | Purpose of being transported in a vehicle. |
| Transit start date-time | Scheduled beginning of being transported by vehicle. |
| Transit end date-time | Scheduled ending of being transported by vehicle. |
| Permitted type of visit | The prisoner's privileges for visitation may dictate the types of visits allowed. Further, the relationship of the visitor may restrict the types of visits allowed. For example, a contact visit may be permitted for a spouse and not permitted for any other visitor. Noncontact visits may be accomplished by video conference. |
| Start date-time for permitted visit | Visitation according to the type of visit in this record may be prescribed during a period of time. For example, contact visits may be planned to be restarted after disciplinary denial of such visits. |
| End date time for permitted visit | The privilege to attend the type of visit in this record may be terminated at a given end date-time. |
| Minimum period between visits | Visits may be spread out in time (e.g., once in a month period). |
| Relationship | The relationship between the prisoner and the visitor (e.g., attorney, clergy, father, daughter, friend). Relationship having a value of attorney or clergy may dictate that no recording of the conference is permissible. Lack of same may indicate that recording is required. |
| Date-time of last conference | For the prisoner and visitor of this record, this date-time serves as a comparison for testing whether the visit is permissible with reference to minimum time between visits. |
| Role | A participant's role may restrict scheduling or use as an alternate. May identify what records may bear the participant's name -- all persons named on records of visitors must have the role of visitor. A person may have multiple roles, so as to permit conferences among prisoners. |
| Contact information | Any conventional description of how to provide timely notice to a person. |
| Transit from location | Used to specify transit time. |
| Transit to location | Used to specify transit time. |

When creating a request for a conference to be scheduled, records in several lists may be related by records added to plans. For each relationship of a particular conference record 702 and a particular equipment record 710 (e.g., to book the equipment to be used in the conference) there exists a description of the relationship as a record in equipment plans 704. For each relationship of a particular conference record 702 and a particular inmate record 712 (e.g., to book an inmate to attend a conference) there exists a description of the relationship as a record in inmate plans 706. For each relationship of a particular conference record 702 and a particular visitor record 714 (e.g., to book a visitor to attend a conference) there exists a description of the relationship as a record in visitor plans 708. For each relationship of a particular inmate record 712 and a particular visitor record 714 (e.g., to list a prisoner's permitted visitors) there exists a description of the relationship as a record in inmate's visitors 722.

A method according to various aspects of the present invention conducts a conference among peers. No one peer need initiate the conference. For example, network 101 may include an address for each station. Addresses may be included in conference plans 208 for reference by any conduct conference process 210. When a conference is to be conducted, each station (e.g., via cooperation of 210, 214, and 233) may begin monitoring packets according to addresses (e.g., a station's own address, and packets bearing an address of any participant in the conference). Each station may conduct the conference according to rules associated with the conference.

Figure 8:
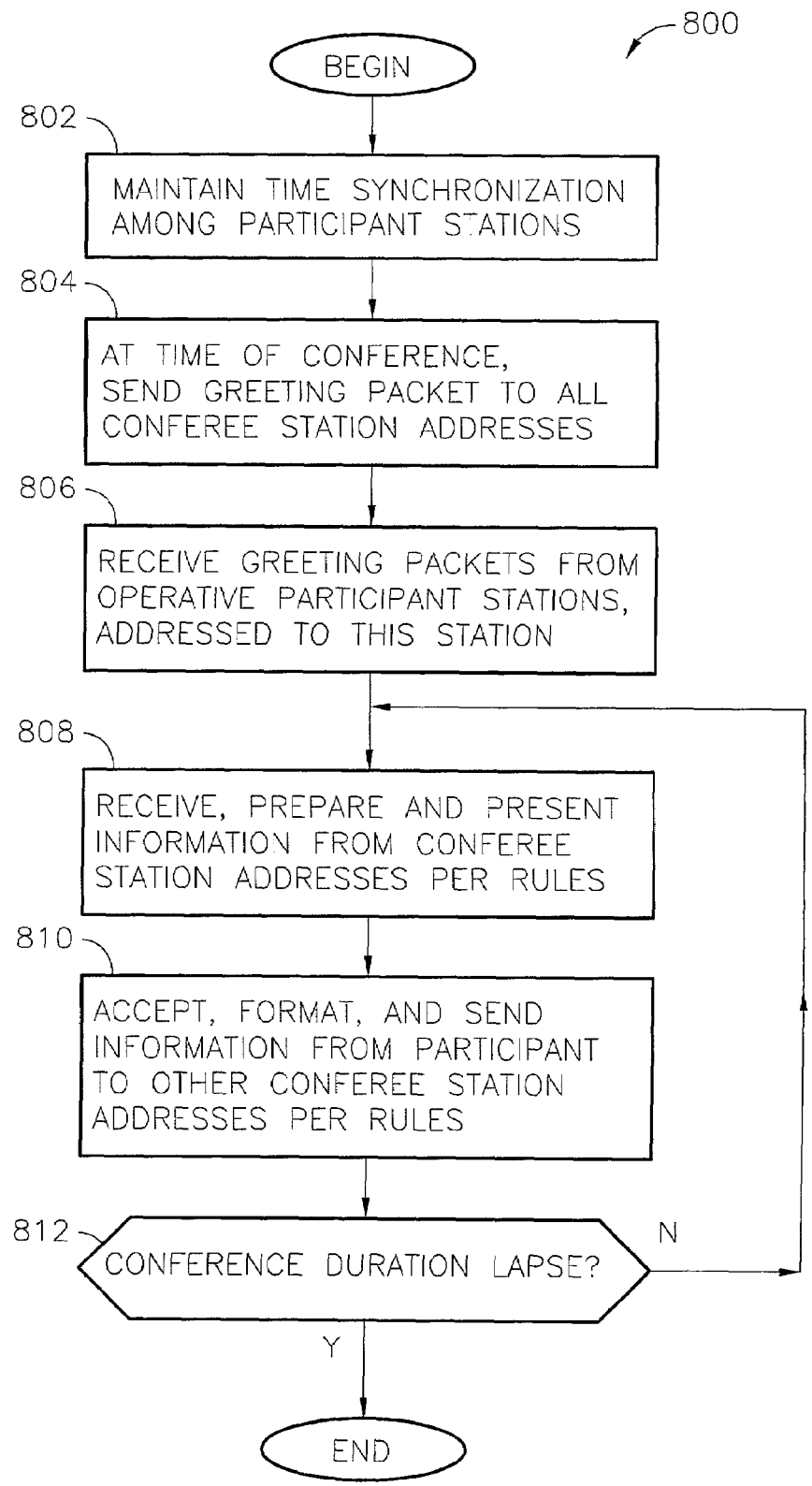
FIG. 8 is a process flow diagram of a method for conducting a conference according to various aspects of the present invention.

For example, method 800 of FIG. 8 may be performed by each conduct conference process 210. In the discussion that follows, the method is performed at a particular station referred to as the current station or "this" station. Each such process continually maintains (802) time synchronization with other stations that are scheduled to participate in an upcoming conference. In one embodiment, a sole authority of date-time information provides messages over network 101. In another embodiment, each station includes a calibrated source of date-time information for reference. In this manner, all stations that are to participate may prepare for or begin participation at a suitable time of the conference (e.g., suitable offsets prior to the conference start time).

When it is determined that action is to be taken by this station to prepare for or begin a conference (e.g., by comparing maintained current date-time to a suitable offset from conference start date-time), a greeting packet is sent to each conference station that has been scheduled to participate in the conference. In one embodiment, each controller 404 sends a conventional network "ping" message to other station addresses including its own address (e.g., a port of network interface 402) to assure that its own port is operational for the conference. Network addresses may be obtained from conference plans 208 or an address indicated by the needed at location discussed above.

Greeting packets are received (806) from other operative participants of the conference as a consequence of each such station sending (804) as discussed above. Each such greeting may be addressed to this station. In an alternate embodiment where network topology permits access to all packets (e.g., a ring), each station monitors the network and intercepts packets (e.g., accepts as received without interfering with reception by others) having an address of any station scheduled to be a participant.

After determining that scheduled participating stations are operative for conducting the conference by receiving greetings or acknowledgements of greetings sent, this station may conduct the conference for the participant at this station by receiving information (808) and sending information (810) for the duration of the conference (812) using the addresses verified to be operational as discussed above.

Receiving information may include receiving packets addressed from conference participant stations, preparing, and presenting information (e.g., audio, video, and data) to the participant at this station. Rules may dictate that some packets received from conference participants are to be obscured (e.g., in whole or in part muted, not shown, or scrambled) from the participant at this station. When audio is to be obscured, the speaker's image may also be obscured from the video portion of the conference.

Sending information may include accepting (e.g., via microphone, via camera, or by reading local data storage), formatting, and sending packets addressed to conference participant stations. Rules may dictate that some addresses are not to be used for some or all information (e.g., omitting, selecting, truncating, or scrambling).

Rules for conducting a conference may present the impression of private conferences as part of the main conference. For example, any two participants of a main conference may be joined (e.g., go off line as to the main conference) for a private one-on-one conference; and after a suitable time, return to the main conference. The one-on-one conference may be initiated by one of the two participants (e.g., using a participant station having suitable control input capability) or by a participant operating a control station. The video presentation for a one-on-one conference may be noticeably different from the video presentation for a main conference (e.g., different picture in picture quantities or locations or different border).

In an alternate implementation of method 800, use of a particular station by a particular participant is confirmed when the particular participant identifies himself or herself to any suitable participant station. For example, a prisoner or visitor may be directed to a group of stations and told to be seated at any idle station and then follow the instructions on the screen (e.g., for purposes of identification to a suitable conference). When a participant is seated at a station, a coordinator may (a) identify the participant in any conventional manner and (b) identify the station to a scheduled conference. For part (a), identification may be automated or manual. Automated identification may use voice print, thumb print, features of the participant's iris, photo comparison, or voice recognition (e.g., asking for and receiving the prisoners name or number) in a manner similar to rescheduling a conference to a known operative alternative as discussed above. For example, the coordinator may have a control station where control inputs for rescheduling may be made.

Screens are presented via a video monitor to inform participants, coordinators, and others about the current status and planned usage of a participant station. For example, a sequence of screens may guide entering a conference. Notices may inform the participant during a conference. Further, a sequence of screens may guide termination of a conference. Sequences and notices facilitate more efficient utilization of each participant station, especially increasing utilization of each participant station in a group of participant stations at a single site. Input from a control station (e.g., operated by a coordinator), current date-time, and input from a participant may trigger a transition from one screen to another in a sequence. Input from a participant may include a signal from a sensor that detects that a person is ready at a participant station. Such sensors may include a hook switch for a telephone type handset, a touch screen, a strain gauge in the seat detecting a person seated at a station, voice detection, or image detection. Screens for use in system 300 are described in Table 4.

TABLE 4

| Screen ID | Description | Sequence |
| --- | --- | --- |
| Blank | A solid color screen or a conventional animated screen saver indicating that the station is operational and that there is no scheduled use for this station in the near future (e.g., 3 minutes). Animated screen saver may direct persons to identify themselves at a self service station (e.g., kiosk) or with a coordinator. | After initialization, a hub instructs all its peripheral stations to display the blank screen. A general purpose station, control station, or participant station coupled to network 101 typically has at least a basic set of processes as discussed above with reference to FIG. 2 for conference participation. After initialization of those processes, a blank screen is displayed. Follows conference audio/video screen when participant initiate hang-up; or, follows hang-up screen when conference is otherwise terminated. |
| Reserved | A notice to the effect that the station is reserved for a conference. May include identification of the participant that is expected to use this station for that conference. | Follows a blank screen. If the existing screen is not blank, some form of termination is generally completed, resulting in a blank screen. Automatically triggered by current date-time being about 2 minutes prior to a start date-time of a conference specifying use of this station. Manually triggered as directed by coordinator when a properly identified participant shows up for a scheduled conference at the site. Automatically triggered when a participant operates a self service station that confirms his or her identity for a scheduled conference. |
| Pickup | Instruction for participant to pick up the telephone handset (thereby | Follows a reserved screen, though may follow a blank screen when the reserved |

TABLE 4-continued

| Screen ID | Description | Sequence |
|---|---|---|
| | releasing the hook switch) and wait to be connected. Audio on handset speaker may be further instructions, advertising, or "hold" music. May be two screens: pickup, and wait; thereby acknowledging handset was picked up. | screen is omitted. Automatically triggered by current date-time being about 1/2 minute prior to a start date-time of a conference specifying use of this station. Manually triggered as directed by coordinator when a properly identified participant shows up for a scheduled conference at the site. Automatically triggered when a participant operates a self service station that confirms his or her identity for a scheduled conference. |
| Conference audio/ video | Generally a video image from one or more cameras of the conference. May have a unique border indicating that the conference is being recorded. Border may be omitted if recording is intended to be without notice to participant. May have a unique border indicating that this is a subconference as opposed to the main conference (e.g., a temporary conversation by less than the full conference participants). May include fixed text or marquee text for notices (e.g., names of other participants attending/absent, names of data participants, current date-time, elapsed time, time remaining, warnings that current date-time is within a threshold amount of the conference end date-time). Visual warnings may be replaced or supplemented by audio warnings. | Follows pickup screen when at least this participant and another participant has the handset off-hook as indicated by the hook switch. Generally cannot be obtained when the current date-time is outside the prescribed period of time of a properly scheduled conference — conference start date-time and conference end date-time. Maintained until conference is terminated: (a) by this participant operating the hook switch; (b) by a coordinator that manually intervenes to terminate a conference for any reason; (c) automatically as indicated when the current date-time exceeds the conference end date-time. |
| Hang-up | Instruction for participant to put the handset back onto the hook (thereby operating the hook switch) and either (a) leave the station; or (b) standby for another conference that this participant is scheduled to attend. May use separate screens for hang-up instruction, instruction as in (a), and instruction as in (b). | Follows conference audio/video screen. Typically maintained for 1/2 minute. |

Figure 9A:
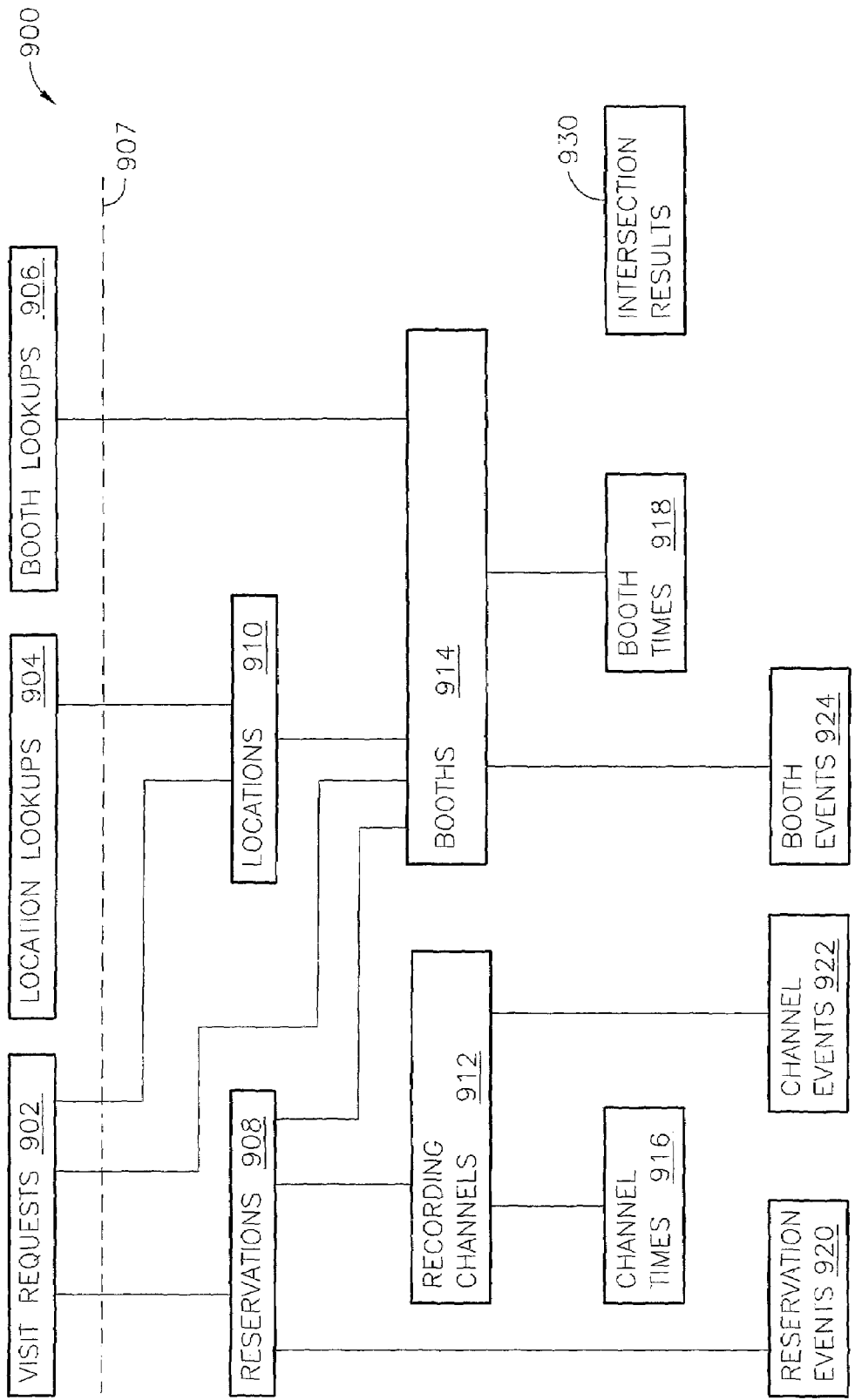
Figure 10:
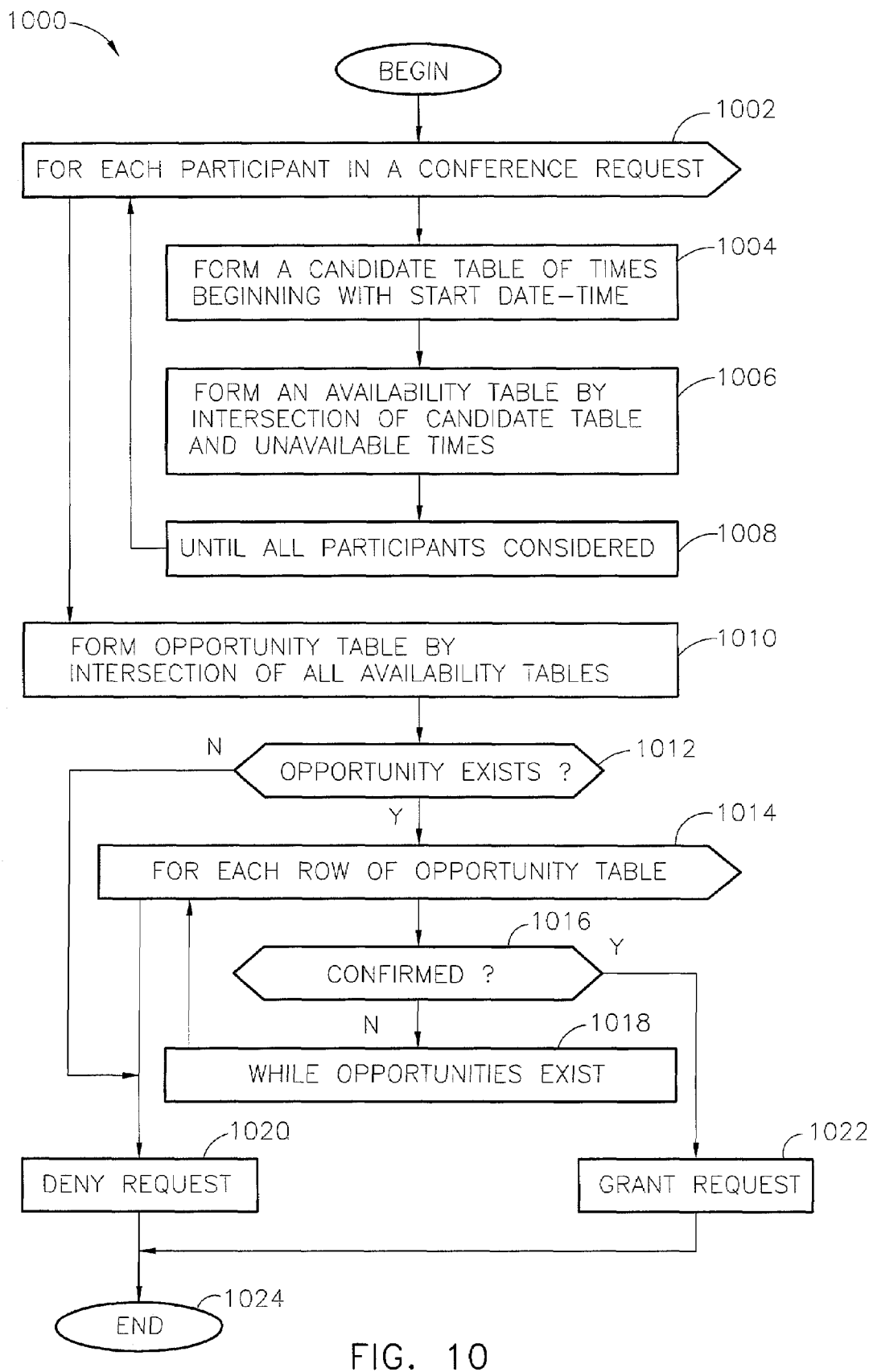
FIG. 10 is a process flow diagram of a method for scheduling a conference according to various aspects of the present invention.

A database in another implementation according to various aspects of the present invention, uses set intersection to accomplish scheduling of a conference. For example, database 900 of FIG. 9A includes lists of records for visit requests 902, location lookups 904 and booth lookups 906. An interface 907 may limit access to other portions of database 900. For example, when visit requests 902, location lookups 904, and booth lookups 906, are stored on jail management system 304, control station 306, and/or office 311, operators and software running on those systems do not have access to other portions of database 900. Limiting access may be accomplished in any conventional manner (e.g., use of access control lists, user account privileges, a log-in protocol, a communication protocol, or restricting access to information which would enable access to other portions of database 900). Database 900 may be implemented in a central computer system where interface 907 is erected between processes or processors in any conventional manner. Such a computer system may include multiple cooperating servers. Database 900 further includes reservations 908, locations 910, recording channels 912, booths 914, channel times 916, booth times 918, reservation events 920, channel events 922, booth events 924, and intersection results 930. Fields of the records of each of each list are described in Table 5.

TABLE 5

| Field | Description |
|---|---|
| Request ID | A visit (e.g., a conference) is requested by providing the information stored in a visit request record 902. Information for a request may be supplied by a system or an operator, for example, manual input on a data entry screen. A visit request once made is given an identification. A visit request may result in a reservation being made or result in another disposition as described in the disposition field discussed below. |
| Visitor ID | A unique identifier for a person to be included in a conference. Where the person's given name is not unique, any additional information may |

TABLE 5-continued

| Field | Description |
|---|---|
| | be used in addition or in place of given name. The visitor may have been registered and issued an identification card or badge. By presenting the visitor card or badge to a conference coordinator, a match to the visitor ID may be made and the visitor may be positively identified for permission to make a visit request, or permission to participate in a scheduled conference. |
| Inmate ID | A unique identifier for an inmate, as discussed above. |
| Location | A visit request is made in terms of a location which may identify a site as discussed above, for example, a site having any number of conference participant stations. Although a reservation may uniquely specify particular conference participant stations, a visit request may be made in terms of particular conference participant stations or particular sites having one or more suitable conference participant stations. |
| Booth type | A conference participant station (herein called a booth) is a single user station that may be equipped for use by a handicapped person or a person with no handicap. Handicap may include limitations in physical mobility, seating, standing, and variations of conference equipment 218 to facilitate participation. In addition to handicap, any suitable distinction of booth type may be used to designate that a particular visitor or inmate prefers to use a booth of a particular configuration (e.g., booth type), as described above with reference to permitted type of visit. |
| Requested date-time | The period of a conference may be requested as a start time and duration or as a start time and an end time. |
| Requested duration | Duration may be specified in any suitable granularity (e.g., minutes, quarter hours, hours). The duration may also be specified as a code for a standardized duration (e.g., 27 minutes, 55 minutes). |
| Request created date-time | A date and time corresponding to when the visit request record was created. Requests that were created may be logged and archived. Access to visit requests may be indexed on any suitable field or combination of fields. Archiving may be based on the date and time the request record was created and its disposition. |
| Disposition | A request may be pending after first made, approved after manual review, granted after a reservation identification has been established for this visit request, on hold when the approved request has not yet been scheduled, or denied. The disposition field records a suitable code for these results and is available for queries. |
| Reservation ID | Each conference is identified in database 900 by a reservation identifier. The functions of a reservation identifier may be similar to the functions of a conference identifier as discussed above. |
| IJMS location ID | Interface to jail management system (IJMS) 907 may provide translation between location identifiers as used in the jail management system and location identifiers as used in a video conference system. The mapping of location codes known to the jail management system may provide access to all or a subset of location identifiers known to video conference systems. By omitting an entry in location look-ups 904 for a particular location identifier known to the video conference system, the jail management system may be unable to schedule a conference using that particular video conference location. Further, information about use of the video conference locations may be concealed from operators and processes of the jail management system. In an alternate implementation, reservations may be made by one or more jail management systems and/or one or more users of conference control stations of any type described above. For example, video conferences may be scheduled to include inmates via the jail management system. Video conferences may be scheduled for business purposes among any operators of conference stations 319 in office 311. A portion of reservations 908 and related lists of records, may be maintained in a distributed manner. For example, reservations related to locations known to the jail management system may be stored with or as a part of database 304. Records for visits may be stored at any station or hub. |
| IJMS booth ID | The booth identifier known to the jail management system may differ from the booth identifier known to the video conference system. The difference between a jail management system booth identifier and a video conference system booth identifier is analogous to the difference discussed above with reference to a jail management system location identifier. A booth identifier specifies the location of a particular single user conference participant station. |
| Channel identifier | For conferences to be recorded, channel identifier identifies the facility to be used for recording the conference. The recording facility may include audio and video recording at one or more hubs as discussed above. |
| Status: Requested, confirmed | In a minimal system the status of a reservation may be designated as requested (for a visit request that is on hold) or confirmed (when a visit request has been scheduled). Confirmation of a reservation may require operator input at any conference station. |

TABLE 5-continued

| Field | Description |
| --- | --- |
| Type of access | Access to a location may be subject to personal security limitations. Access type may be described to a Boolean designating whether the area is accessible to visitors or not. An area confined for inmates is generally not accessible to visitors. A booth located in a visitor center 312 would generally be identified as accessible to visitors. |
| Location description | A street address or physical description of the location. May be presented during manual confirmation of a conference. |
| Recording port | Several recording ports may be identified to the same channel identifier for the purpose of separately recording audio and video signals. Additional ports may be identified through the same channel identifier to support recording from several participant stations. Any channel may include recording of a formatted composite video signal (e.g., audio and video formatted from several stations). |
| Video Port | An identifier of the video signal source (camera) of the identified booth. A port may be a network address or multiplex circuit selection code. |
| Audio Port | An identifier of the audio signal source (handset) of the identified booth. A port may be a network address or multiplex circuit selection code. |
| Video Equipment Identifier | A serial number of the video equipment for tracking video equipment reliability. |
| Audio Equipment Identifier | A serial number of the audio equipment for tracking audio equipment reliability. |
| State | For equipment, state describes (e.g., by a suitable code) status and configuration of equipment. State may include on/off line flag, date-time back in service, date-time last tested, or other equipment reliability tracking information. State may also include whether or not the equipment is functional. A transition from functional to non-functional may give rise to rescheduling the conference as discussed above. For a reservation, state may include a record of the presentation of screens as described above with reference to Table 4. For a channel event, state may include beginning and ending recording as controlled, for example, by a designated hook switch or operator control at a monitoring conference control station. For a booth, state may include the status and progress of the conduct of a video conference (e.g., posting date-time of hook switch changes, posting date-time of screen presentations as discussed above with reference to Table 4). |
| Posted Date-Time | The date and time at which the event record was created, or the date and time that a change of state was recognized. |
| Date-Time Slot | Time slots on particular dates are filled when a video conference is scheduled that commits that time slot. A slot is a period of time in any suitable granularity. One or more time slots may be used to satisfy the requested duration of a visit request (902). |

Database 900 accommodates visits having one visitor and one inmate. An alternate implementation of database 900 accommodates visits having a larger maximum number of participants. In the alternate database, a visit request record 902 includes a tuple of values for ID, LOCATION, and BOOTH TYPE for each of several visitors (e.g., four) and for each of several inmates (e.g., two). Further, a reservation record 908 includes a corresponding number of values for BOOTH ID to accommodate all participants.

A method for recording a video conference, according to various aspects of the present invention, may include recording audio and video originating at each of several conference participant stations and recording the date and time of events associated with the video conference. An event includes any change of state or any change of the contents of a database record (e.g., create, modify, delete). By recording events in the form of new or revised database records, access to a particular video conference or access to a portion of a video conference is facilitated according to any conventional database access technique (e.g., selection of particular events, selection of video conferences that include a particular event or sequence of events, selection of a video conference having particular participants, selection of video conferences that occurred at a particular location or for a particular period of time).

A video conference may be requested and scheduled according to a method that uses set intersections to efficiently accomplish scheduling. In such a method, temporary database lists (e.g., files, indexes, or views) may be created in advance of scheduling a particular request or a set of requests. For example, channel times 916 and booth times 918 may be created in advance of scheduling requests in general and maintained for reference when scheduling requests. Intersection results 930 may be prepared in response to a request and discarded when the request has been either granted or denied. For example, method 1000 begins with a loop for considering each participant in a conference request (1002). For each participant, a candidate table is formed (1004). A candidate table includes a list of time slots beginning with the start date and time of the requested conference. A candidate table may extend for any suitable period likely to include a successful conference reservation start date and time. For example, a candidate table may extend for 24 business hours (or 24 time slots) ahead of the beginning start date and time. Each time record of a candidate table may correspond to a time slot as discussed above. Next, an availability table is formed. The candidate table and availability table are part of intersection results 930. An availability table is formed (1006) as a result of the intersection of the candidate table and a list of times that are unavailable. A list of unavailable times may be prepared for a particular location and period of time by a suitable query of reservations 908. A list of booth identifiers suitable for such a query may include all identifiers identified to the requested locations for the visitor and inmate (and any other participants in the conference). A candidate table and an availability table are formed for each participant (1008) until all participants have been considered. For the purpose of this loop, a participant includes any person, station, recording facility, equipment, or data that may be required for conduct of the requested video conference.

After participant availability tables have been formed, an opportunity table is formed (1010) as a result of the intersection of all availability tables discussed above. An opportunity table may have zero or more records resulting from the intersection of availability tables. If the opportunity table has no records, the conference request may be denied (1020). On the other hand, if it is determined (1012) that one or more opportunities exist (e.g., that more than one record has been listed in the opportunity table), then each row of the opportunity table is considered for scheduling (1014).

For each row of the opportunity table, it is determined whether the time associated with that opportunity is suitable for a video conference. Suitability may be confirmed by any process or operator of a conference station. For example, in a prisoner visitation system, it may be prudent to require confirmation of a video conference by a guard using a conference control station who may be knowledgeable of situations within the prison that may endanger the conference participant (e.g., the named inmate should not be located for the purpose of a conference in an area of the prison dominated by his enemies). A self help kiosk may supply confirmation input entered by a visitor. After it is determined that the opportunity is confirmed, the visit request may be granted (1022) and a record in the reservation list 908 may be identified as confirmed. Intersection results 930 (e.g., including the candidate table, availability table, and opportunity table) may be discarded. On the other hand, if confirmation (1016) is not obtained, then other opportunities in the opportunity table may be considered (1018), while opportunities in the opportunity table have yet to be considered.

After all opportunities in the opportunity table have been considered and no opportunity has been confirmed (1016), the visit request maybe denied (1020). After granting (1022) or denying (1020) of a visit request, the method is complete (1024) wherein the disposition of the visit request 902 may be established in any suitable manner.

Particular advantages are obtained according to various aspects of the present invention so as to facilitate rapid scheduling of video conferences. For example, by maintaining channel times 916 and booth times 918 with records for a suitable number of future time slots, calculation of available date-time slots for a channel or a booth may be simplified in scheduling each visit request. In other words, by maintaining a list of date-time slots associated with a potential conference participant, and querying that list to form a candidate table (1004) as discussed above, the determination of unavailable time is greatly simplified. Further, when a participant's availability changes, for example, when a visitor center changes visiting hours, affecting the availability of all booths at that visiting center, such a change may readily be recorded as a change in booth times 918. As another example, when a booth is expected to have periodic maintenance or when unexpected failure of the booth will require an extended period of time for repair, changes in booth times 918 may be made so that reservations are not granted for periods of time when the booth is not available.

In an alternate implementation, inmate times and visitor times are recorded in lists in a format similar to booth times 918 for use analogous to booth times 918 discussed above.

In an implementation having multiple hubs, each with a portion of the scheduling data relevant to their conference participant stations, scheduling a conference may include requesting at a first hub an availability table or an opportunity table from a second node. In addition to the channel times, booth times, inmate times, and visitor times lists discussed above, each hub maintains network port times (not shown) as a list in a manner analogous to booth times 918 for scheduling a limited number of network ports of network interface 402. A request for a table may include a list of the participants scheduled by the second hub. Participants may include conference participant stations, one or more network ports, a recorder channel, auxiliary equipment, and auxiliary data items. The request may further include a specification of the requested conference start date-time, an extent of the candidates table (e.g., to assure uniformity in availability tables), identification of the type of table requested by the first hub (e.g., availability table for each requested participant, opportunity table for the combination of requested participant, or a combination of tables), and a hold time sufficient for the first hub to complete the scheduling process. The hub receiving a request may prepare the requested table or tables and deliver these results to the first hub. If a hold time is omitted by the first hub, the second hub may specify a hold time after lapse of which the provided data is no longer valid for scheduling purposes. The second hub may make a suitable record in its database and hold all time slots delivered for the hold time. After the first hub accomplishes preparation of availability tables, preparation of an opportunity table, selection of an opportunity, and confirmation to schedule the conference in accordance with the selected opportunity, the first hub may inform the second hub of the conference schedule (e.g., conference identifier, start date-time, end date-time, and rules for conducting the conference). The second hub may schedule the conference as to the participants (e.g., stations, equipment, network nodes, recorder channels, data items) under its control and provide an acknowledgement of success to the first hub.

The method discussed above may be extended to operate from the first hub to any number of second hubs. The request may further include a list of hubs that are included in scheduling the conference. When the first hub receives notice of successful subordinate scheduling by one or more second hubs, the first hub may consider the request for a conference successfully completed.

If a hub detects that a participant for the conference is or likely will be unavailable at the start date-time for the conference, the hub may reschedule the participant with cooperation with other hubs if needed. Cooperation may be needed, for example, when conduct of the conference by another hub makes reference to the participant (e.g., a network node of the second node). For example, if a hub has an alternate conference participant station for a conference participant station that was scheduled but is likely not available for the conference, the hub may reschedule a suitable portion of the conference schedule to use the alternate conference participant station without providing notice of rescheduling informing other hubs that may be involved in the conference. If the hub determines that the conference must be cancelled due to unavailability of some or all of the participants it schedules, the hub may provide notice of cancellation to one or more hubs indicated in the request as being involved in the conference. A second hub may reschedule all or its portion of the conference in response to receiving notice of rescheduling or cancellation to free resources for other conferences.

Databases 700 and 900 and methods discussed above may grant conference reservations on a first-come first-served basis. In an alternate implementation, each request and reservation is associated with a respective rank. Reservations having lower rank than a pending request are subject to rescheduling to accommodate the higher ranking request. For example, an alternate conference record 702 further includes CONFERENCE RANK reflecting the highest participant rank or a conference rank specified in a conference request. An alternate visit request record 902 and alternate reservation record 908 each includes a CONFERENCE RANK. Conference rank may be an integer having higher values for higher priority scheduling and higher immunity to being rescheduled by subsequent requests. An alternate method 1000 includes the preparation of a list of unavailable times for a participant that includes scheduled times of lower ranking conferences. In other words, the fact that a participant is included in a lower ranking conference at a particular time does not eliminate that time from consideration for a higher ranking scheduling (or rescheduling) process. After a higher ranking conference request is granted, schedule conflicts may have been created for one or more participants. Elimination of these schedule conflicts may be accomplished by converting each conflicted conference into a request, placing the requests in sequence in a queue, and rescheduling each request possibly adding further requests to the queue until the queue is empty. Sequence may be determined with reference to conference rank, date and time of the original request, number of times previously rescheduled, transit time allowances for participants, and allowances needed for notifying participants of rescheduling. Fields for maintaining such information may be added to suitable records of database 700 or 900.

An alternate implementation of databases 700 and 900 may accommodate sufficient time for notifying participants in the event of a scheduling, cancellation, or rescheduling action. If sufficient time is not available for notifying a participant, the scheduling request may be denied, the request to cancel (e.g., for a higher ranking conference) may be denied, or the request to reschedule may be denied. Consequently, another time slot may be considered for the requested conference; or another request may be generated manually or automatically with a greater allowance for notification in an effort to successfully meet all notification criteria.

An alternate conference record 702 may include a rule or value that determines a minimum allowed notification time (e.g., sufficient to meet the maximum of notification times associated with participants). A value of this type may be included in each of an alternate equipment description record 716, an alternate inmate record 712, and an alternate visitor record 714. A value of this type may be included in each of an alternate conference request record 902, an alternate reservation record 908, and an alternate booths record 914.

Because the satisfaction of a relatively high ranking conference request may initiate an unacceptable system rescheduling burden and/or an unacceptable profusion of notices to coordinators and participants, an alternative schedule conference process 204 or 1000 may score the rescheduling and notification burden and report the score for acknowledgement by the administrator or requester prior to initiating scheduling and consequent rescheduling. Such a score may be accomplished by performing the scheduling processes as discussed above in a temporary workspace until the queue of rescheduling requests has been emptied. The estimate may be based on one or more (e.g., a sum or weighted sum) of a count of the total number of rescheduled conferences, a count of the total number of coordinators and/or participants to be notified, and transit times (e.g., those exceeding a threshold) for participants effected by rescheduling.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A system comprising:
   (a) a data store, coupled to a network, for maintaining participant information comprising an identifier of a first participant;
   (b) a conference control station, coupled to the network, for scheduling a conference, the conference being scheduled with the identifier of the first participant, wherein the conference control station determines sites for the conference by comparing available sites to locations to which participants are allowed access;
   (c) a first site comprising a first conference control station for coordinating a conference coupled to the network; and a plurality of first participant stations for participating in a conference coupled to the network; and
   (d) a second site comprising a second conference control station for coordinating a conference coupled to the network; and a plurality of second participant stations for participating in a conference coupled to the network; wherein:
   (e) the first conference control station for coordinating provides a first notice of a conference; notice being provided for assuring participation by the first participant at a particular first participant station for participating identified in the first notice, wherein the first conference control station selects the particular first participant station based on the status of the participant stations; and
   (f) the second conference control station for coordinating provides a second notice of the conference for assuring participation by a second participant at a particular second participant station for participating identified in the second notice, wherein the second conference control station selects the particular second participant station based on the status of the participant stations.

2. The system of claim 1 wherein:
   (a) the data store further comprises an identifier of the second participant;
   (b) the conference control station schedules the conference with the identifier of the second participant; and
   (c) the second notice comprises the identifier of the second participant.

3. The system of claim 1 wherein the data store comprises a jail management system and the identifier of the first participant identifies a prisoner of the jail.

4. The system of claim 3 wherein the second identifier identifies a visitor.

5. A system comprising:
   (a) a network;
   (b) a plurality of participant stations for participating in a conference coupled to the network, the plurality arranged with at least one site having a multiplicity of particular participant stations, the plurality including the multiplicity; and (c) a conference control station for coordinating a conference coupled to the network and located at the site, wherein the conference control station provides notice to a participant for directing the participant to a particular participant station; wherein the conference control station identifies appropriate sites for the conference through comparing available sites to areas to which the participants are allowed access; and (d) wherein at least one participant station is located in a secured location, wherein in person contact to the participant is limited.

6. A system comprising:

(a) a network;

(b) a conference control station for operating a database comprising participant location information; the conference control station coupled to the network; and (c) a plurality of sites, each site comprising:

a respective multiplicity of first participant stations, coupled to the network; and a respective second conference control station for coordinating a conference, the second conference control station physically distinct from the first conference control station, the second conference control station coupled to the network; wherein (d) notice is provided to a participant to attend a conference, notice being provided by a particular conference control station of a particular site determined in accordance with the database to be nearest the participant at a time prior to the conference and to which the participant is allowed access;

(e) wherein at least one of the plurality of sites is located in a secured location to which access is restricted; and (f) wherein the conference control station selects a time for the participant to begin transit to the site where the conference will be held.

7. The system of claim 6 wherein the conference control station is operated by a person to provide the notice, operation being without action by the participant.

8. The system of claim 6 wherein the conference control station is operated by a coordinator.

9. A system for conducting a conference, the system comprising:

(a) a network; and (b) a plurality of hubs, each hub being for coupling a respective plurality of participant stations to the network; wherein each hub comprises:

a data store for storing respective indicia of the conference, wherein indicia of the conference comprise a start time, identification of participant stations of the respective plurality for the conference; wherein participant stations are identified by comparing the location of available stations to locations which participants' are allowed access; and a switch for initiating communication to conduct the conference, communication being with the identified participant station; initiating being aborted if a signal is not received by the switch from the identified participant station within a period after the start time.

10. The system of claim 9 wherein the participant station comprises a sensor for detecting beginning use of the station by a participant; and the signal is provided by the sensor when use by a participant is detected.

11. The system of claim 9 wherein:

(a) the participant station comprises a sensor for detecting beginning use of the station by a participant;

(b) the indicia of the conference further includes identification of a participant; and (c) the signal is provided by the sensor when use is begun by the participant identified to the station in accordance with the indicia of the conference.

12. The system of claim 9 wherein the participant station comprises a handset and a hook switch; and the signal is provided in accordance with operation of the hook switch.

13. A The system of claim 9, further comprising a database for at least one of planning, conducting, and recording a conference, the database comprising:

(a) a schedule conference process for associating a conference identifier, a participant identifier, and indicia of a physical location where the participant is expected for participation in the conference corresponding to the conference identifier; and (b) a conduct conference process for accessing the association to accomplish at least one of planning, conducting, and recording the conference.

14. The database of claim 13 wherein the participant is at least one of an inmate, a visitor of the inmate, and a judge.

15. The database of claim 14 wherein the database further comprises:

(a) second schedule conference process for associating the identifier of the participant, an identifier of a visitor, and indicia of a relationship of the participant and the visitor; wherein (b) the indicia of relationship describes at least one of a familial, employment, representation, religious, and social relations.

16. The system of claim 9, further comprising a database for at least one of planning, conducting, and recording a conference, the database comprising:

(a) a schedule conference process for associating a conference identifier, an equipment identifier, and indicia of a physical location where the equipment is expected for participation in the conference corresponding to the conference identifier; and (b) a conduct conference process for accessing the association to accomplish at least one of planning, conducting, and recording the conference.

17. A method for conducting a conference via a system having a plurality of sites, each site including a multiplicity of participant stations and a control station, the system further comprising a database for maintaining a tuple including a conference identifier, an identifier of a participant, and an identifier of a participant station, the method comprising:

a step for obtaining a notice at the control station of a site, the notice comprising the conference identifier, the identifier of a participant, and the identifier of a participant station;

a step for calculating a time for a participant to begin to get ready for the conference based on a transit time associated with the participant or the participant's location; and a step for directing a participant to a participant station in accordance with the notice, the participant corresponding to the identifier of the participant, the participant station corresponding to the identifier of the participant station.

18. The method of claim 17 wherein the participant performs the step for obtaining at a self service station coupled to the network, the self service station comprising the control station.

19. The method of claim 17 wherein a conference coordinator performs the step for directing.

20. The method of claim 17 wherein the notice in the step for obtaining comprises notice for a plurality of participants to be advised by the conference coordinator.

21. The method of claim 17 wherein the notice in the step for obtaining comprises notice for a plurality of scheduled conferences involving the participant.

22. A method for conducting a conference via a system having a multiplicity of participant stations and a control station, the system further comprising a database for maintaining a tuple including a conference identifier, an identifier of a participant station, and an identifier of a participant, the method comprising:
   a step for detecting the unavailability of a first participant station of the multiplicity;
   a step for detecting the availability of an alternate participant station of the multiplicity;
   a step for comparing a wear factor associated with the alternate participant station with a plurality of wear factors associated with individual participant stations of the multiplicity of participant stations and selecting an alternate participant station with the least amount of wear;
   a step for obtaining confirmation that the alternate participant station is to be used in the conference corresponding to the conference identifier;
   a step for obtaining confirmation that a participant is allowed access to a location where the alternative participant station is located;
   a step for revising the tuple to exclude the first participant station and to include an identifier of the alternate participant station to reschedule the conference;
   a step for obtaining at the control station a notice that the conference associated with the conference identifier is to commence, the notice in accordance with the revised tuple; and
   a step for directing a participant corresponding to the identifier of the participant to the alternate participant station in accordance with the notice.

23. The method of claim 22 wherein the step for detecting unavailability comprises at least one of:
   a step for comparing a signal from a microphone to a first threshold to determine unavailability;
   a step for analyzing a signal to noise ratio of a signal from a microphone to determine unavailability;
   a step for comparing a signal from a camera to a second threshold to determine unavailability; and
   a step for analyzing a signal to noise ratio of a signal from a camera to determine unavailability.

24. The method of claim 22 wherein the step for detecting availability comprises:
   a step for assuring that the notice will be timely as provided in accordance with at least one of a transit time and a notification time associated with at least one of the identifier of the participant and the identifier of the alternate participant station.

25. The method of claim 24 wherein the step for detecting unavailability comprises:
   a step for detecting at least one of the unavailability of the participant associated with the identifier of the participant and the unavailability of the first participant station in response to detecting a change in value of at least one of a transit time and a notification time associated with at least one of the identifier of the participant and the identifier of the first participant station.

26. A method for conducting a conference via a system having a multiplicity of participant stations and a control station, the system further comprising a database for maintaining a first tuple and a second tuple, the first tuple relating a conference identifier, an identifier of a participant station, and an identifier of a participant, the second tuple relating the identifier of the participant and a location of the participant, the method comprising:
   a step for detecting a revision of the second tuple; and
   a step for rescheduling the conference in accordance with the revised second tuple;
   a step for determining the location of participant stations available for the rescheduled conference; and
   a step for comparing the location of available participant stations with locations to which the participant is allowed access.

27. The method of claim 26 wherein the step for rescheduling comprises a step for canceling the conference corresponding to the conference identifier of the first tuple.

28. A method for conducting a conference via a system, the system including a multiplicity of participants and a database for maintaining a tuple of a conference identifier and an identifier of a first participant, the method comprising:
   a step for detecting the unavailability of a participant corresponding to the identifier of the first participant;
   a step for detecting the availability of an alternate participant; and
   a step for revising the tuple to exclude the identifier of the first participant and to include an identifier of the alternate participant, to reschedule the conference;
   a step for determining whether or not the participants are allowed to have a conference with each other;
   a step for revising the tuple based upon the allowability of the conference;
   a step for determining whether or not the conference should be recorded and if recorded, whether or not the participants should be notified of the recording; and
   a step for revising the tuple based on whether or not the conference is to be recorded.

29. The method of claim 28 wherein the first participant is at least one of a human participant, an equipment participant, a data participant, and a recorder channel.

30. A method for scheduling a first conference in accordance with a request, the request comprising indicia of a plurality of participants and a start time, the method comprising:
   a step for maintaining for at least one participant of the plurality a list of participants the at least one participant may confer with;
   a step for confirming that each participant of the plurality may confer with every other participant of the plurality;
   a step for maintaining for each participant of the plurality a respective first list of future times;
   a step for forming for each participant of the plurality a respective sublist of the first list including times after the start time;
   a step for forming for each participant of the plurality a respective second list of unavailable times;
   a step for intersecting for each participant of the plurality the respective first list and the respective second list to form a respective availability list;
   a step for intersecting all participant availability lists to form an opportunity list;
   a step for determining whether recording the conference between the participants is desired;

a step for determining whether recording the conference is allowed;

a step for determining whether the participants of the conference should be notified that the conference is being recorded;

a step for scheduling the first conference in accordance with a selected item of the opportunity list, wherein scheduling of the first conference is conditional on acceptance of a score based on a transit time associated with a participant of the first conference: and a step for rescheduling a second conference after scheduling the first conference, the second conference being rescheduled to eliminate a conflict with the first conference, wherein rescheduling of the second conference is conditional on acceptance of a score based on a transit time associated with a participant of the second conference.

31. The method of claim 30 wherein:
(a) the step for scheduling comprises a step for posting to a database a record comprising a conference start time; and
(b) the step for forming for each participant of the plurality a respective second list of unavailable times comprises a step for obtaining a query result from the database.

32. The method of claim 30 wherein the step for forming a respective second list comprises a step for assuring that times associated with lower ranking conferences are not excluded from the second list.

33. The method of claim 30 wherein scheduling of the first conference is further conditional on acceptance of a score based on at least one of:
(a) a count of the total number of conferences that would have conflicts with at least one of the schedule of the first conference and the schedule of any rescheduled conference; and
(b) a count of the total number of at least one of coordinators and participants associated with the first conference and any rescheduled conference.

34. A method for scheduling a conference among stations of a plurality in accordance with a first request formed at a first station of the plurality, the first request comprising indicia of a plurality of participants and a start time, the method comprising:

a step for maintaining for at least one participant of the plurality a list of participants the at least one participant may confer with;

a step for confirming that each participant of the plurality may confer with every other participant of the plurality;

a step for maintaining for each participant of the plurality a respective first list of future times;

a step for sending a second request to a second station of the plurality, the second request comprising indicia of at least one particular participant of the plurality of participants and the start time;

a step for forming for each participant of the plurality a respective sublist of the first list including times after the start time;

a step for forming for each participant of the plurality a respective second list of unavailable times;

a step for intersecting for each participant of the plurality the respective first list and the respective second list to form a respective availability list;

a step for receiving a response to the second request, the response comprising an availability list of the particular participant;

a step for intersecting all participant availability lists including the availability list of the particular participant to form an opportunity list;

a step for forming a proposed schedule of the conference in accordance with a selected item of the opportunity list;

a step for providing a notice to the second station in accordance with the proposed schedule; and a step for scheduling the conference in accordance with a response to the notice.

35. A method for conducting a video conference by a system, the system including a database, at least two conference coordinators and at least two conference participant stations, each station comprising a microphone for inputting audio and a sensor for detecting use of the microphone by a participant, of the method comprising:

a step for recalling from the database a start time for a conference;

a step for detecting use of the respective microphone of each station;

a step for coupling the conference participant stations for the video conference in accordance with whether use was detected at each station within a respective predetermined time that includes the start time;

a step for revising the start time in accordance with failing to detect use of the respective microphone of each station within the respective predetermined time;

a step for beginning the conference when use of the respective microphone of each station is detected within the respective predetermined time;

a step for terminating the conference when one of the at least two conference coordinators determines that a participant's behavior is inappropriate; and a step for terminating the conference when termination of use of the microphone is detected.

36. The method of claim 35 wherein the method further comprises:

a step for presenting a notice at each station that the station has been scheduled for the conference; and a step for presenting at each station an instruction for a participant to begin using the microphone.

37. The method of claim 35 wherein:
(a) the database is stored in part at each station; and
(b) the step for recalling is accomplished at each station with reference to a respective part of the database.

38. The method of claim 35 further comprising:
a step for determining an end time of a conference in accordance with the database;

a step for displaying at each station a remaining duration of the conference; and a step for decoupling the conference participant stations to discontinue video conferencing in accordance with the end time.

39. The method of claim 38 wherein the step for displaying a remaining duration displays a continuously updated remaining duration.

40. The method of claim 38 wherein:
(a) the database is stored in part at each station; and
(b) the step for determining an end time is accomplished at each station with reference to a respective part of the database.

41. The method of claim 38 further comprising:
a step for presenting at each station an instruction for a participant to cease using the microphone; and a step for presenting at each station an instruction for the participant to leave the station.

42. A method for conducting a conference via a system having a multiplicity of participant stations and a control station, the system further comprising a database for maintaining a tuple including a conference identifier, an identifier of a participant station, and an identifier of a participant, the method comprising:

- a step for detecting the unavailability of a first participant station of the multiplicity;
- a step for detecting the availability of an alternate participant station of the multiplicity;
- a step for comparing a wear factor associated with the alternate participant station with a plurality of wear factors associated with individual participant stations of the multiplicity of participant stations and selecting an alternate participant station with the least amount of wear;
- a step for obtaining confirmation that the alternate participant station is to be used in the conference corresponding to the conference identifier;
- a step for revising the tuple to exclude the first participant station and to include an identifier of the alternate participant station to reschedule the conference;
- a step for obtaining at the control station a notice that the conference associated with the conference identifier is to commence, the notice in accordance with the revised tuple; and
- a step for directing a participant corresponding to the identifier of the participant to the alternate participant station in accordance with the notice.

* * * * *